(12) United States Patent
Yamamuro et al.

(10) Patent No.: US 12,195,896 B2
(45) Date of Patent: Jan. 14, 2025

(54) NONWOVEN FABRIC, LAYERED NONWOVEN FABRIC COMPRISING THE NONWOVEN FABRIC, AND COMPOSITE SOUND-ABSORBING MATERIAL USING THEM AS SKIN MATERIAL

(71) Applicant: Asahi Kasei Kabushiki Kaisha, Tokyo (JP)

(72) Inventors: Shinya Yamamuro, Tokyo (JP); Chie Okamura, Tokyo (JP); Rumina Obi, Tokyo (JP); Eiji Shiota, Tokyo (JP); Kazufumi Kato, Tokyo (JP); Yasuo Nakanishi, Tokyo (JP)

(73) Assignee: Mitsui Chemicals Asahi Life Materials Co., Ltd., Tokyo (JP)

( * ) Notice: Subject to any disclaimer, the term of this patent is extended or adjusted under 35 U.S.C. 154(b) by 634 days.

(21) Appl. No.: 17/413,102

(22) PCT Filed: Dec. 12, 2019

(86) PCT No.: PCT/JP2019/048802
§ 371 (c)(1),
(2) Date: Jun. 11, 2021

(87) PCT Pub. No.: WO2020/122205
PCT Pub. Date: Jun. 18, 2020

(65) Prior Publication Data
US 2022/0010471 A1    Jan. 13, 2022

(30) Foreign Application Priority Data
Dec. 13, 2018    (JP) .................................. 2018-233671

(51) Int. Cl.
*D04H 1/54*    (2012.01)
*G10K 11/168*    (2006.01)

(52) U.S. Cl.
CPC ............. *D04H 1/54* (2013.01); *G10K 11/168* (2013.01); *D10B 2331/04* (2013.01)

(58) Field of Classification Search
CPC . D04H 1/54; D04H 3/016; B32B 3/26; B32B 7/02; B32B 7/04; B32B 7/12;
(Continued)

(56) References Cited

U.S. PATENT DOCUMENTS

2006/0292954 A1    12/2006    Suzuka et al.
2011/0266088 A1    11/2011    Koike et al.
(Continued)

FOREIGN PATENT DOCUMENTS

CN    1777507 A    5/2006
CN    101097715 A    1/2008
(Continued)

OTHER PUBLICATIONS

Office Action issued in corresponding European Patent Application No. 19896511.3 dated Jan. 28, 2022.
(Continued)

*Primary Examiner* — Camie S Thompson
(74) *Attorney, Agent, or Firm* — Morgan, Lewis & Bockius LLP

(57) ABSTRACT

Provided are a non-woven cloth and a layered non-woven cloth that are preferred as a skin material for a composite sound-absorbing material, which has excellent moldability and exceptional shape stability, and with which it is possible to achieve an adequate sound-absorption effect even in thin low-weight regions.

15 Claims, 2 Drawing Sheets

(58) Field of Classification Search
CPC .......... B32B 5/022; B32B 5/028; B32B 5/06; B32B 5/08; B32B 5/20; B32B 5/245; B32B 5/26; B32B 2262/02; B32B 2262/0246; B32B 2262/0253; B32B 2262/0261; B32B 2262/12; B32B 2262/0284; B32B 2266/0228; B32B 2266/0242; B32B 2266/025; B32B 2266/0264; B32B 2266/0278; B32B 2266/0285; B32B 2266/06; B32B 2307/10; B32B 2307/306; B32B 2307/3065; B32B 2307/4026; B32B 2307/42; B32B 2307/518; B32B 2307/554; B32B 2307/718; B32B 2307/7265; B32B 2307/732; B32B 2307/75; B32B 2418/00; B32B 2605/00; D10B 2331/04

See application file for complete search history.

(56) References Cited

U.S. PATENT DOCUMENTS

| | | | |
|---|---|---|---|
| 2012/0045626 | A1 | 2/2012 | Inokuma et al. |
| 2015/0239204 | A1 | 8/2015 | Takebe et al. |
| 2016/0329039 | A1 | 11/2016 | Takata |
| 2019/0055684 | A1 | 2/2019 | Koizumi et al. |
| 2020/0316906 | A1 | 10/2020 | Yamamuro et al. |

FOREIGN PATENT DOCUMENTS

| | | | |
|---|---|---|---|
| CN | 201233717 | Y | 5/2009 |
| CN | 102282013 | A | 12/2011 |
| CN | 202702758 | U | 1/2013 |
| CN | 104619901 | A | 5/2015 |
| CN | 105940444 | A | 9/2016 |
| CN | 108884616 | A | 11/2018 |
| JP | 2002-069824 | A | 3/2002 |
| JP | 3705419 | B2 | 10/2005 |
| JP | 2007125546 | * | 5/2007 |
| JP | 2008-142911 | A | 6/2008 |
| JP | 2009-000843 | A | 1/2009 |
| JP | 2009-145425 | A | 7/2009 |
| JP | 2010-196235 | A | 9/2010 |
| JP | 4574262 | B2 | 11/2010 |
| JP | 2011-000792 | A | 1/2011 |
| JP | 2011-052332 | A | 3/2011 |
| JP | 2012-045509 | A | 3/2012 |
| JP | 4919881 | B2 | 4/2012 |
| JP | 2013-163869 | A | 8/2013 |
| JP | 2014-037647 | A | 2/2014 |
| JP | 5603575 | B2 | 10/2014 |
| JP | 2015-121631 | A | 7/2015 |
| JP | 2019-151963 | A | 9/2019 |
| KR | 10-1998-0081186 | A | 11/1998 |
| KR | 10-1695997 | B1 | 1/2017 |
| WO | 2019/124231 | A1 | 6/2019 |

OTHER PUBLICATIONS

International Search Report issued in corresponding International Patent Application No. PCT/JP2019/048802 dated Jan. 28, 2020.
International Preliminary Report on Patentability and Written Opinion issued in corresponding International Patent Application No. PCT/JP2019/048802 dated Jun. 24, 2021.
Supplementary European Search Report issued in related European Patent Application No. 19896511.3 dated Jan. 17, 2022.

* cited by examiner

NONWOVEN FABRIC, LAYERED NONWOVEN FABRIC COMPRISING THE NONWOVEN FABRIC, AND COMPOSITE SOUND-ABSORBING MATERIAL USING THEM AS SKIN MATERIAL

FIELD

The invention relates to a nonwoven fabric. Specifically, the invention relates to a nonwoven fabric that, when used as a skin material for a composite sound-absorbing material, efficiently increases the sound absorption property of the base material while having satisfactory moldability, small thickness, light weight, excellent shape stability and excellent connectivity with the base material, and it also relates to a layered nonwoven fabric comprising the nonwoven fabric, and to a composite sound-absorbing material using the same as a skin material.

BACKGROUND

Traveling vehicles produce various kinds of noise including noise from engines and drive systems mounted in the vehicles, road noise from traveling, and wind noise. In order to avoid discomfort to passengers by such noise, sound-absorbing materials are applied as anti-noise measures on the wall faces of engine hoods, dash panels, ceiling materials, door trimmings and cab floors. In PTL 1, for example, there is proposed a multilayer structure comprising a sound-absorbing material made of a porous material such as a nonwoven fabric or resin foam as the sound-absorbing material, and a skin layer such as a nonwoven fabric or resin film whose air permeability is controlled to a fixed range, layered in an integral manner on the sound-absorbing base material. The skin layer, may have a complex shape depending on the particular vehicle member, and must be moldable, so that it needs to have both controlled air permeability and moldability.

PTL 2 proposes a sound-absorbing material comprising a nonwoven fabric surface material made of a layered nonwoven fabric with a melt-blown ultrafine fiber layer and a synthetic long fiber layer integrated by thermocompression bonding, and a synthetic fiber nonwoven fabric back material with a coarse structure at a bulk density of 0.005 to 0.15 g/cm$^3$, but the moldability of the nonwoven fabric surface material is not at all mentioned. In addition, surface agents have a major effect on the synthetic fiber nonwoven fabric, and it has not been capable of absorbing sound in a wide frequency range.

In PTL 3 there is proposed a nonwoven fabric with excellent moldability, comprising a melt-blown ultrafine fiber layer and a spunbond nonwoven base fabric-added staple fiber nonwoven fabric, layered in an integral manner by a mechanical interlacing method, but because it is layered in an integral manner by mechanical interlacing, it has a large nonwoven fabric thickness, which is disadvantageous from the viewpoint of occupying less space as a vehicle member. Since sound propagates and enters through the holes produced by mechanical interlacing, it also has the disadvantage of poor sound absorption properties, while breakage of the fibers can also lead to reduced nonwoven fabric strength or rigidity, and generation of dust.

In PTL 4 there is proposed a nonwoven fabric with improved moldability, having reduced molecular orientation by adding a non-compatible polymer to a polyester for the constituent fibers of a thermocompression bonded long fiber nonwoven fabric, but when a spunbond nonwoven fabric having a relatively large fiber size is used alone, the air permeability is too high and the effect of increasing the sound absorption property of the base material is inadequate.

PTL 5 also proposes a nonwoven fabric having thermoplastic long fiber layers with reduced crystal orientation as upper and lower layers, and a thermoplastic microfilament layer formed by melt blowing and having a mean fiber size of 2 μm to 10 μm, as an interlayer, the layers being integrated by thermal bonding using a felt calender, wherein the thermal bonding is point bonding between the fiber surfaces of the thermoplastic long fiber layer, and between the fiber surfaces of the thermoplastic long fiber layer and the fiber surfaces of the thermoplastic microfilament layer. However, while the layered nonwoven fabric has excellent thermal moldability, the high degree of heat shrinkage during molding at high temperature as occurs with molding of vehicle members tends to result in disadvantageous wrinkle formation. The large fiber sizes of the thermoplastic microfilaments of the interlayer are also disadvantageous because they result in poor denseness and therefore a poor sound absorption property, as a skin material for a composite sound-absorbing material for vehicles.

CITATION LIST

Patent Literature

[PTL 1] Japanese Unexamined Patent Publication No. 2015-121631
[PTL 2] Japanese Patent Publication No. 4574262
[PTL 3] Japanese Patent Publication No. 3705419
[PTL 4] Japanese Patent Application No. 2009-145425
[PTL 5] Japanese Patent Publication No. 5603575

SUMMARY

Technical Problem

In light of the prior art described above, the problem to be solved by the invention is to provide a nonwoven fabric and layered nonwoven fabric that have satisfactory moldability, excellent shape stability, and that are suitable as skin materials for composite sound-absorbing materials capable of exhibiting a sufficient sound absorption effect even in thin, low-basis-weight regions.

Solution to Problem

As a result of conducting much ardent research to solve the problem stated above, the present inventors have completed this invention upon finding that if a continuous long fiber layer (S) is integrated with an ultrafine fiber layer (M) by thermocompression bonding, with the ultrafine fiber layer (M) and continuous long fiber layer (S) in a specific bonding area ratio, a sound absorption effect can be exhibited up to the continuous long fiber layer (S) which has been considered most difficult to provide with a sound absorption property.

Specifically, the present invention is as follows.

[1] A nonwoven fabric having a layered structure in which at least one ultrafine fiber layer (M) with a mean fiber size of 0.3 μm to 7 μm is integrated with at least one continuous long fiber layer (S) with a mean fiber size of 10 μm to 30 μm, wherein the bonding area ratio between the ultrafine fiber layer (M) and the continuous long fiber layer (S) is 45% to 80%.

[2] The nonwoven fabric according to [1] above, wherein the integration is by thermocompression bonding.

[3] The nonwoven fabric according to [2] above, wherein the thermocompression bonding is partial thermocompression bonding.

[4] The nonwoven fabric according to [3] above, wherein the contact bonding area ratio in the partial thermocompression bonding is 6% to 35%, and the distance between the partial thermocompression bonded sections is 0.6 mm to 3.5 mm in both the MD (machine direction) of the nonwoven fabric, and the CD (cross direction) that is perpendicular to the MD.

[5] The nonwoven fabric according to any one of [1] to [4] above, wherein the basis weight of the ultrafine fiber layer (M) is 1 g/m² to 40 g/m².

[6] The nonwoven fabric according to any one of [1] to [5] above, wherein the continuous long fiber layer (S) is composed of long fibers that contain 97.0 wt % to 99.9 wt % of a polyester (component A) and 0.1 wt % to 3.0 wt % of a thermoplastic resin with a glass transition point temperature of 114° C. to 160° C. (component B), and the bulk density of the ultrafine fiber layer (M) is 0.35 g/cm³ to 0.70 g/cm³.

[7] The nonwoven fabric according to [6] above, wherein component A is polyethylene terephthalate and component B is a polyacrylate-based resin.

[8] The nonwoven fabric according to any one of [1] to [7] above, wherein the continuous long fiber layer (S) is composed of long fibers with a birefringence of between 0.04 and 0.07, and the bulk density of the ultrafine fiber layer (M) is 0.35 g/cm³ to 0.70 g/cm³.

[9] The nonwoven fabric according to any one of [1] to [8] above, wherein the nonwoven fabric has on its surface a continuous long fiber layer that includes fibers with a melting point of at least 30° C. lower than the melting point of the other layers.

[10] The nonwoven fabric according to any one of [1] to [9] above, wherein the basis weight of the nonwoven fabric is 20 g/m² to 150 g/m², and the thickness is 2 mm or smaller.

[11] The nonwoven fabric according to any one of [1] to [10] above, wherein the ultrafine fiber layer (M) and the continuous long fiber layer (S) are both composed of polyester-based fibers.

[12] A layered nonwoven fabric in which two or more nonwoven fabrics according to any one of [1] to [11] above are layered.

[13] The layered nonwoven fabric according to [12] above, which includes two or more ultrafine fiber layers (M), wherein one or more continuous long fiber layers (S) are disposed between each of the ultrafine fiber layers (M), and the distances between each of the ultrafine fiber layers (M) are 30 μm to 200 μm.

[14] The layered nonwoven fabric according to [12] or [13] above, wherein two or more SM-type or SMS-type nonwoven fabrics integrated by thermocompression bonding are layered in an integral manner.

[15] The layered nonwoven fabric according to any one of [12] to [14] above, wherein the bonding between the fibers of the ultrafine fiber layers (M) and continuous long fiber layers (S) or of the continuous long fiber layers (S) is point bonding.

[16] The nonwoven fabric or layered nonwoven fabric according to any one of [1] to [15] above, which is to be used as a skin material of a sound-absorbing material.

[17] A composite sound-absorbing material in which a nonwoven fabric or layered nonwoven fabric according to [16] above and an open-cell resin foam or fiber porous material as a sound-absorbing material are layered.

[18] The composite sound-absorbing material according to [17] above, wherein the mean sound absorption coefficient A (%) for sounds impinging from the skin material side at frequencies of 1000 Hz, 1600 Hz, 2000 Hz, 2500 Hz, 3150 Hz and 4000 Hz, by normal incidence measurement according to JIS A 1405, is at least 45% higher than that of the sound-absorbing base material alone.

[19] A method for producing a nonwoven fabric, comprising the following steps in order:
(1) a step of forming a continuous filament web with a mean fiber size of 10 μm to 30 μm on a net;
(2) a step of forming an ultrafine fiber web with a mean fiber size of 0.3 μm to 7 μm and a basis weight of 1 g/m² to 40 g/m² on the continuous filament web;
(3) a step of nipping a layered web comprising the continuous filament web and the ultrafine fiber web between a smooth roll and a net; and
(4) a step of thermocompression bonding the layered web between an embossing roll and a smooth roll.

[20] The method according to [19] above, which further includes the following step between step (2) and step (3):
(5) a step of forming a continuous filament web with a mean fiber size of 10 μm to 30 μm on the ultrafine fiber web.

[21] The method according to [19] or [20] above, wherein the surface temperature of the smooth roll in step (3) is 60° C. to 120° C. lower than the melting point of the fibers contacting with the roll.

[22] The method according to any one of [19] to [21] above, wherein the linear pressure of the nip is 1 N/mm to 10 N/mm in step (3).

Advantageous Effects of Invention

Since the nonwoven fabric of the invention is a nonwoven fabric with satisfactory moldability, small thickness, light weight and excellent shape stability, while also allowing air permeability control to within a fixed range, and being suitable as a skin material for a composite sound-absorbing material, it can be most suitably used as a skin material for moldable composite sound-absorbing materials such as those for vehicles, homes, household electrical appliances and construction equipment.

DESCRIPTION OF EMBODIMENTS

Figure 1:
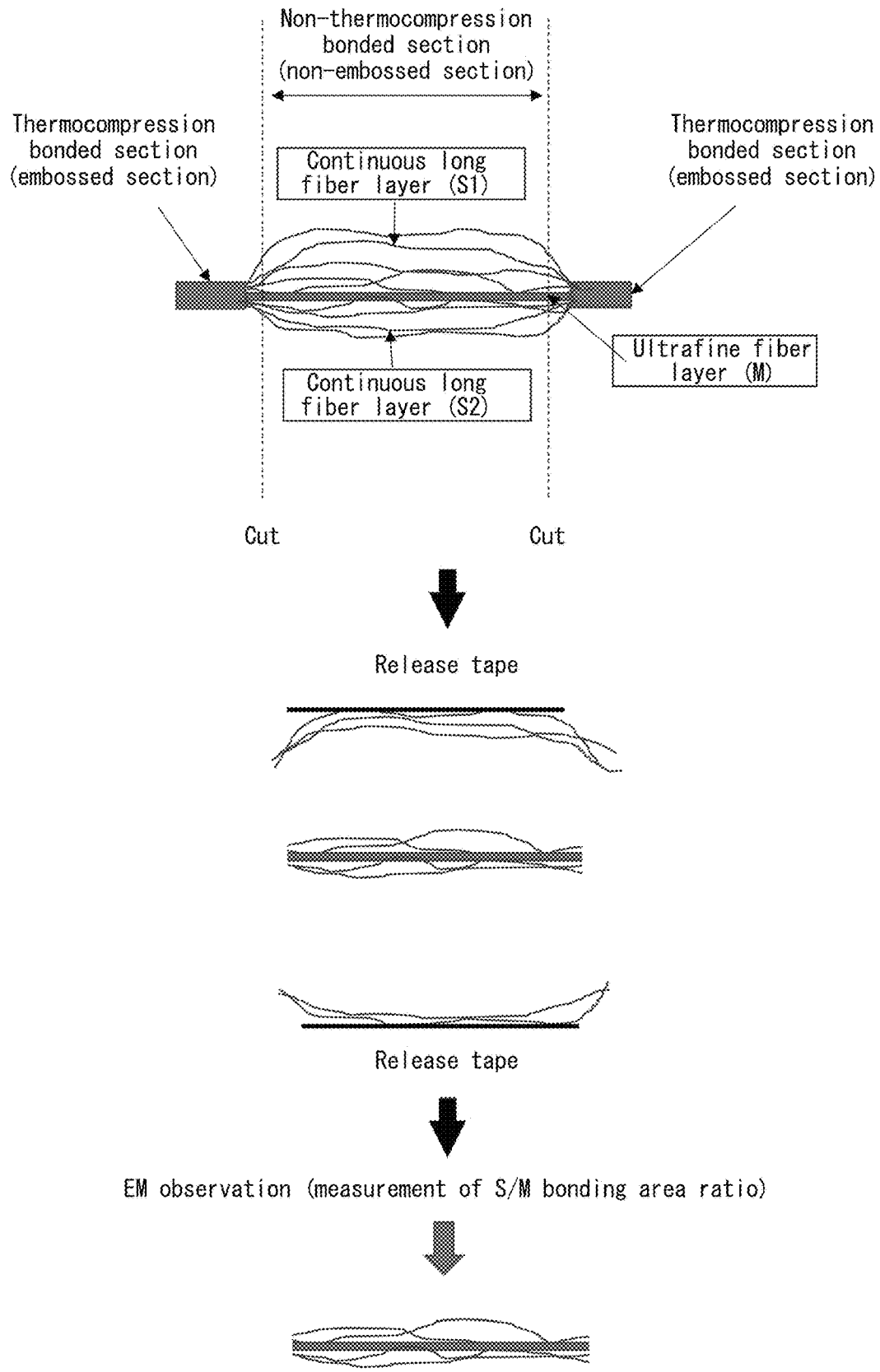
FIG. 1 is a diagram illustrating a method of measuring the bonding area ratio (%) between an ultrafine fiber layer (M) and a continuous long fiber layer (S).

Embodiments of the invention will now be described in detail.

The nonwoven fabric of this embodiment is a nonwoven fabric having a layered structure in which at least one ultrafine fiber layer (M) with a mean fiber size of 0.3 μm to 7 μm is integrated with at least one continuous long fiber layer (S) with a mean fiber size of 10 μm to 30 μm, wherein the bonding area ratio between the ultrafine fiber layer (M) and the continuous long fiber layer (S) is 45% to 80%.

Nonwoven fabrics or layered nonwoven fabrics of these embodiments may be used as sound-absorbing skin materials, and may be combined with base materials. As used herein, the term "nonwoven fabric" refers to a fiber sheet (web) of a monolayer or multiple layers in an unbonded state, integrated in a continuous manner from spinning during production, or by a process other than spinning. The nonwoven fabric of this embodiment is a nonwoven fabric having multiple fiber sheets layered in an integrated manner, which may be SM, SMS, SMM, SMMS, SMSMS or SMSSMS, for example. The term "layered nonwoven fabric" means a nonwoven fabric obtained by overlaying and integrating the aforementioned "nonwoven fabrics", examples of which include SMMS, SMSM, SMSMS, SMSSMS and SMMSMS.

The term "nonwoven fabric" or "layered nonwoven fabric" may also be collectively referred to herein as "skin material", "surface material" or "face material".

In the nonwoven fabric of the embodiment, a compact structure is present having a very low degree of air permeability and very small fiber voids in terms of fiber structure, and when sound infiltrates through the fiber voids the vibrational sound energy is converted to thermal energy by friction with the ultrafine fibers, while the fibers themselves also absorb vibrational sound energy and vibrate, allowing further conversion to thermal energy. When this has been combined with a sound-absorbing material (base material), the sound absorption property of the sound-absorbing material increases dramatically. Since the nonwoven fabric of this embodiment includes at least one ultrafine fiber layer (M) having a mean fiber size of 0.3 μm to 7 μm, and preferably a basis weight of 1 g/m$^2$ to 40 g/m$^2$ and a bulk density of 0.35 g/cm$^3$ to 0.70 g/cm$^3$, vibrational sound energy is converted into thermal energy due to friction with the ultrafine fibers, and when combined with a sound-absorbing material it can exhibit an effect of improving the sound absorption properties of the sound-absorbing material.

The nonwoven fabric of this embodiment has a structure in which a continuous long fiber layer (S) is bonded on an ultrafine fiber layer (M), produced by integrated layering, thereby exhibiting an effect so that when the ultrafine fiber layer (M) has vibrated by vibrational sound energy, the vibrational energy is transmitted to the sites where the ultrafine fiber layer (M) and continuous long fiber layer (S) are bonded, causing vibration up to the continuous long fiber layer (S) which has larger fiber sizes that are less able to vibrate. This contributes to improved sound absorption while maintaining the strength of the continuous long fiber layer (S), so that a low basis weight is achieved for the nonwoven fabric while it maintains its sound absorption property. The term "continuous long fibers" used here is synonymous with fibers composing a continuous long fiber nonwoven fabric or continuous fiber nonwoven fabric" as defined in JIS L 0222, and fibers produced by a spunbond method are continuous long fibers.

The method used to obtain a bonded (integrated) structure for the continuous long fiber layer (S) on the ultrafine fiber layer (M) may be as described below. Either integration by coating of an adhesive resin, or integration by thermocompression bonding, is possible. Examples of integration by thermocompression bonding include joining by thermocompression bonding between a known embossing roll and smooth roll (hereunder also referred to as "flat roll"), joining by thermocompression bonding between a smooth roll and smooth roll, or joining by thermocompression bonding between hot flat plates. The most preferred method is joining by thermocompression bonding between a known embossing roll and smooth roll, which for non (partial)-thermocompression bonded sections (considered to be the same as non-embossed sections in this method), as shown in FIG. 1, can inhibit densification of the ultrafine fiber layer (M) making penetration of sound less likely to be inhibited, while vibrational sound energy will be transmitted even at the non (partial)-thermocompression bonded sections, at the sites where the ultrafine fiber layer (M) and continuous long fiber layer (S) are joined, making it possible to adequately exhibit an effect of causing vibration up to the continuous long fiber layer (S) which has large fiber sizes that are resistant to vibration. Moreover, since firm integration is achieved at the (partial) thermocompression bonded sections (considered to be the same as embossed sections in this method), sufficient strength is exhibited, resulting in satisfactory handleability and adequate moldability.

Since pressure is exerted over the entire nonwoven fabric surface when joining is by thermocompression bonding between a smooth roll and smooth roll, or when joining is by thermocompression bonding between thermal plates, the thermocompression bonding is preferably at low pressure and low temperature, so as to avoid excessive denseness in the ultrafine fiber layer (M) that will inhibit penetration of sound, but to an extent that will not allow interlayer separation between the ultrafine fiber layer (M) and continuous long fiber layer (S).

For integration by coating of an adhesive resin, the amount of resin is preferably such that does not cause blocking of the ultrafine fiber layer (M) and is unlikely to inhibit penetration of sound.

Alternative methods for obtaining a structure with a continuous long fiber layer (S) bonded on an ultrafine fiber layer (M) include a method of integration by mechanical entangling such as needle punching or hydroentangling, and a method of integration by partial heat welding with ultrasonic waves. With integration by mechanical entangling such as needle punching or hydroentangling, however, it becomes difficult to reduce the thickness, while holes are also opened in the ultrafine fiber layer (M), generating sites that allow easy direct infiltration of sound, and therefore the desired sound absorption improving effect is difficult to obtain. Furthermore, with integration by mechanical entangling such as needle punching or hydroentangling, bonding between the ultrafine fiber layer (M) and continuous long fiber layer (S) only takes place at the sections contacted with the needle or water, such that virtually no partial bonding occurs between the ultrafine fiber layer (M) and continuous long fiber layer (S).

A method of integration by partial welding with ultrasonic waves may also be used, whereby welding between the ultrafine fiber layer (M) and continuous long fiber layer (S) is adequately achieved at the (partial) thermocompression bonded sections (considered to be the same as welded parts in this method) that are created at the portions that have contacted with the vibrating unit such as the ultrasonic horn, whereas virtually no partial bonding is achieved between the ultrafine fiber layer (M) and continuous long fiber layer (S) at the non (partial)-thermocompression bonded sections (considered to be the same as the non-welded parts in this method) that have not contacted with the vibrating unit such as the ultrasonic horn.

The method for producing a nonwoven fabric according to this embodiment is preferably one that comprises forming each layer by a series of spinning steps, carrying out low-pressure nipping between a smooth roll (pre-compaction roll) and a conveyor net (also referred to simply as "net") during transport of the web, and then joining them by thermocompression bonding between an embossing roll and smooth roll. For production of a nonwoven fabric with an SMS structure, for example, the continuous long fiber layer (S1) is blast onto a conveyor, the ultrafine fiber layer (M) is subsequently blasted onto the continuous long fiber layer (S1), and finally the continuous long fiber layer (S2) is blasted onto the ultrafine fiber layer (M). In order to help prevent generation of curling defects in the continuous long fiber layer (S1, 2) and to adequately promote partial bonding of the ultrafine fiber layer (M) and continuous long fiber layer (S1, 2) during transport of the web that has been layered in this manner, blasting of the continuous long fiber layer (S1, 2) may be followed by low-pressure nipping between a pre-compaction roll and conveyor net, using a smooth pre-compaction roll. The web that has been moderately integrated by low-pressure nipping between the pre-compaction roll and conveyor net is then subjected to thermocompression bonding between an embossing roll and smooth roll. By carrying out the step of blasting the ultrafine fiber layer (M) onto the continuous long fiber layer (S) and the integration step by low-pressure nipping between the pre-compaction roll and conveyor net, it is possible to increase the bonding area between the ultrafine fiber layer (M) and continuous long fiber layer (S) even in steps other than the thermocompression bonding step.

The heating temperature for the pre-compaction roll is preferably 60° C. to 120° C. lower and more preferably 60° C. to 100° C. lower than the melting point of the fibers in the roll-contact surface, and the pressure is preferably 1 N/mm to 10 N/mm and more preferably 3 N/mm to 7 N/mm. For example. the heating temperature for the pre-compaction roll is preferably 140° C. to 200° C. for polyethylene terephthalate which has a melting point of 260° C. If the heating temperature for the pre-compaction roll is within this range, which is above the glass transition temperature, the molecular structure of the resin will move more readily and the temperature will be sufficiently lower than the melting point, thereby helping to adequately promote partial bonding between the ultrafine fiber layer (M) and continuous long fiber layer (S). If the heating temperature for the pre-compaction roll is not too high, the fibers will be less likely to melt, the fibers will be less likely to adhere to the pre-compaction roll during processing, and transport of the nonwoven fabric will be facilitated.

Another possible method is to first form the continuous long fiber layer (S) and ultrafine fiber layer (M) by thermocompression bonding between an embossing roll and smooth roll, and then to simply laminate each layer and integrate them by any of various thermocompression bonding methods, although in this case care must be taken during handling of the ultrafine fiber layer (M), which has inferior strength.

The bonding area ratio between the ultrafine fiber layer (M) and continuous long fiber layer (S) of the nonwoven fabric of this embodiment is 45 to 80%, preferably 50 to 75% and more preferably 55 to 75%. If the bonding area ratio between the ultrafine fiber layer (M) and continuous long fiber layer (S) is 45% or greater, vibrational energy of the ultrafine fiber layer (M) will be readily transmitted to the continuous long fiber layer (S), allowing the continuous long fiber layer (S) to be adequately vibrated to result in a higher sound absorption effect being imparted to the sound-absorbing base material. Excessive densification of the ultrafine fiber layer (M) can also be prevented if the bonding area ratio is 80% or lower, tending to facilitate infiltration of sound and resulting in a high effect of imparting high sound absorption to the sound-absorbing base material. In other words, if the bonding area ratio between the ultrafine fiber layer (M) and continuous long fiber layer (S) is within this range, penetration of sound will not be inhibited and the continuous long fiber layer (S) can be adequately vibrated, thus increasing the effect of imparting sound absorption to the sound-absorbing base material.

The bonding area ratio between the ultrafine fiber layer (M) and continuous long fiber layer (S) can be adjusted to within a desired range in the formation step during spinning, by the pre-compaction roll temperature, the nip pressure and temperature of the pre-compaction roll and conveyor net, the amount of fibers in the continuous long fiber layer (S), their fiber size, the temperature during thermocompression bonding, and the embossing shape.

The bonding area ratio A between the ultrafine fiber layer (M) and continuous long fiber layer (S) can be determined by the following method. In the following explanation, a single continuous long fiber layer will be referred to as (S1), and two continuous long fiber layers will be referred to as (S1) and (S2).

Figure 2:
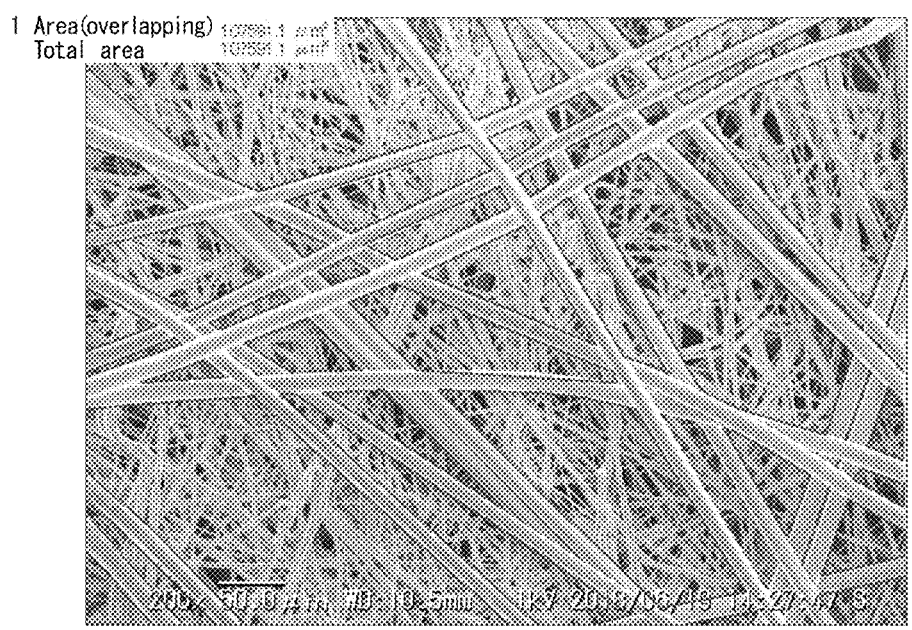
FIG. 2 is an SEM photograph of an ultrafine fiber layer (M) at a non (partial)-thermocompression bonded section between an ultrafine fiber layer (M) and a continuous long fiber layer (S).

In the case of a partial thermocompression bonded nonwoven fabric, the bonding area ratio A between the ultrafine fiber layer (M) and continuous long fiber layer (S) can be calculated by adding the area ratio Ab, where the ultrafine fiber layer (M) and the continuous long fiber layer (S1) and/or (S2) are essentially bonded at the non (partial)-thermocompression bonded sections, to the partial thermocompression bonding area ratio Aa. As shown in FIG. 1, the area ratio Ab where the ultrafine fiber layer (M) and the continuous long fiber layer (S1) and/or (S2) are essentially bonded at the non (partial)-thermocompression bonded sections can be calculated by cutting a non (partial)-thermocompression bonded section from the partial thermocompression bonded section with scissors, a cutter knife or the like, using adhesive tape (CT405AP-15 cellophane tape by Nichiban Co., Ltd.) to remove the fibers in the continuous long fiber layer (S1) and/or (S2) that are raised and unbonded with the ultrafine fiber layer (M), and then calculating the total area based on the area value of each section partitioned by S layer fibers in the ultrafine fiber layer (M) that can be observed between the fibers of the continuous long fiber layer (S1) and/or (S2), in a scanning electron microscope (SEM) surface photograph of the M layer at 200× magnification (see FIG. 2), and then dividing the total area Sa by the total area St of the observation field and subtracting it from 1. In other words, the "bonding area ratio A (%) between the ultrafine fiber layer (M) and continuous long fiber layer (S) is determined by the following formula:

$$A = Aa + Ab$$

$$Ab = 100 \times (1 - (Sa/St)).$$

If there is no interlayer separation of the nonwoven fabric, such as when partial thermocompression bonding is not present, or when the fibers in the continuous long fiber layer (S1) and/or (S2) cannot be removed when attempted using adhesive tape (CT405AP-15 cellophane tape by Nichiban Co., Ltd.) by the method described above, or when no physical bonding is present, then it is judged to be a full-surface-bonded nonwoven fabric, in which case the area where the ultrafine fiber layer (M) and continuous long fiber layer (S1) and/or (S2) are bonded is essentially considered to be the bonding area ratio. The area where the ultrafine fiber layer (M) and continuous long fiber layer (S1) and/or (S2) are essentially bonded can be calculated by first calculating the total area Sa based on the area value of each section partitioned by S layer fibers in the ultrafine fiber layer (M) that can be observed between the fibers of the continuous long fiber layer (S1) and/or (S2), in a scanning electron microscope (SEM) nonwoven fabric surface photograph at 200× magnification, and dividing this by the total area Sn of the observation field and subtracting the quotient from 1. In other words, the "bonding area ratio A between the ultrafine fiber layer (M) and continuous long fiber layer (S)" is determined by the following formula:

$$A=100\times(1-Sa/Sn).$$

When the ultrafine fiber layer M cannot be observed in a photograph of the nonwoven fabric surface, the bonding area ratio is considered to be 100%.

In the nonwoven fabric of this embodiment, the ultrafine fiber layer (M), which has poor handleability by itself and poor moldability such that it is prone to tearing during molding, is layered and integrated by thermocompression bonding with the continuous fiber layer (S) that has lower molecular orientation of the fibers, and therefore the moldability of the ultrafine fiber layer is improved. The main role of the continuous long fiber layer can thus be exhibited, preventing excessive stress from being applied to the ultrafine fiber layer during stretching, and thereby allowing the ultrafine fiber layer to be evenly stretched.

For the nonwoven fabric of this embodiment, the collecting surface is blasted with heated air under specific conditions in the step of forming the ultrafine fiber layer, thereby inhibiting self-adhesion of the ultrafine fiber layer and thus making the ultrafine fibers more easily loosened during the stretching, so that the moldability of the ultrafine fiber layer can be further improved.

The continuous long fiber layer (S) of the nonwoven fabric of this embodiment preferably has low orientation and crystallinity of the constituent fibers, as well as cold stretchability and hot stretchability. Low orientation and low crystallinity of the continuous long fibers can be achieved by reducing the spinning speed, or by polymer blending. The orientation and crystallinity of the continuous long fibers can be measured by the birefringence, and cold stretchability and hot stretchability can be easily obtained with low birefringence.

The birefringence Δn of the continuous long fiber layer (S) is preferably 0.04 to 0.07, more preferably 0.04 to 0.07, even more preferably 0.04 to 0.06 and most preferably 0.04 to 0.05. If the birefringence Δn is within this range, the fibers will have suitable orientation and fibers with high ductility will be obtained allowing calendering to be carried out with a sufficient heat quantity, while a suitable heat quantity can also be added during partial thermocompression bonding and a continuous long fiber layer that is resistant to heat shrinkage and has excellent heat resistance can be obtained. A birefringence Δn within this range will also result in sufficient ductility of the fibers and will allow sufficient moldability to be obtained.

The spinning process applied for the continuous long fiber layer (S) is preferably a known spunbond method. It is preferably formed under conditions in which the yarn is homogeneously dispersed by frictional electrification or corona electrification. By employing such conditions it is easier to form a web in an unbonded state and to achieve excellent economy. The web of the continuous long fiber layer may be either a single layer or a stack of multiple layers.

The material forming the continuous long fiber layer (S) is preferably a thermoplastic synthetic resin with which fibers can be formed by melt spinning. Examples of thermoplastic synthetic resins include polyolefin-based resins (such as polyethylene, polypropylene and copolymerized polypropylene), aromatic polyester-based resins, aliphatic polyester-based resins (such as poly D-lactic acid, poly L-lactic acid, copolymers of D-lactic acid and L-lactic acid, copolymers of D-lactic acid and hydroxycarboxylic acid, copolymers of L-lactic acid and hydroxycarboxylic acid, copolymers of D-lactic acid, L-lactic acid and hydroxycarboxylic acid, and blends of the foregoing), polyamide-based resins (such as polyamide 6, polyamide 66 and copolymerized polyamide), and polyphenylene sulfide. For the thermoplastic synthetic resin it is particularly preferred to use aromatic polyester-based resins, which have excellent heat resistance and water resistance. An aromatic polyester-based resin is a thermoplastic polyester, typical examples of which are polyethylene terephthalate (PET), polybutylene terephthalate and polytrimethylene terephthalate. The aromatic polyester-based resin may also be a polyester obtained by polymerization or copolymerization of isophthalic acid or phthalic acid as an ester-forming acid component.

The continuous long fiber layer of the nonwoven fabric in contact with the base material of the composite sound-absorbing material may also include fibers having a melting point of at least 30° C. lower than the melting point of the fibers of the other layers. That is, in order to maintain satisfactory adhesion between the nonwoven fabric surface material and the base material, the layer that contacts with the base material may have a fiber structure with a low melting point. Examples of low melting point fibers include polyester-based fibers such as aromatic polyester copolymers obtained by copolymerizing one or more compounds from among phthalic acid, isophthalic acid, sebacic acid, adipic acid, diethylene glycol and 1,4-butanediol, with polyethylene terephthalate, or aliphatic esters. Such fibers may be used alone or as composite mixed fibers with two or more types, or they may be composite mixed fibers comprising low melting point fibers and high melting point fibers. Composite fibers with a sheath-core structure, having a low melting point component as the sheath, may also be used. Examples of composite fibers with a sheath-core structure include polyethylene terephthalate, polybutylene terephthalate and copolymerized polyesters with a high-melting-point component as the core, and copolymerized polyesters and aliphatic esters with a low-melting-point component as the sheath.

A polymer blend may be used to limit the birefringence Δn to the range of 0.04 to 0.07. For example, the continuous long fiber layer may be one composed of long fibers comprising 97.0 wt % to 99.9 wt % of a polyester (component A) and 0.1 wt % to 3.0 wt % of a thermoplastic resin with a glass transition point temperature of 114° C. to 160° C. (component B).

Typical examples of thermoplastic polyesters for the polyester (component A) include polyethylene terephthalate, polybutylene terephthalate and polytrimethylene terephthalate. The thermoplastic polyester may also be a polyester obtained by polymerization or copolymerization of isophthalic acid or phthalic acid as an ester-forming acid component.

The thermoplastic resin with a glass transition point temperature of 114° C. to 160° C. (component B) is preferably at least one type selected from among polyacrylate-based resins.

Since a polyacrylate-based resin may be expected to exhibit an inhibiting effect against oriented crystallization by addition in an extremely small amount, this can prevent fouling of the stretching apparatus by generation of fumes during spinning. If the amount of addition is extremely low with respect to the polyester (component A), then dispersion of the polyacrylate-based resin in the yarn during melt kneading will be homogeneous, and when the nonwoven fabric is stretched it will be possible to inhibit stretch irregularities, allowing local exposure of the core material after molding to be reduced.

Polyacrylate-based resins include polymethyl methacrylate, methyl methacrylate/methyl acrylate binary copolymer, styrene/methyl methacrylate/maleic anhydride copolymer, and styrene/methyl methacrylate/cyclohexyl maleimide copolymer. In order to exhibit an inhibiting effect against oriented crystallization with an even smaller amount of addition, it is preferred to use methyl methacrylate/methyl acrylate binary copolymer, styrene/methyl methacrylate/cyclohexyl maleimide copolymer or styrene/methyl methacrylate/maleic anhydride copolymer.

The amount of addition of the thermoplastic resin with a glass transition point temperature of 114° C. to 160° C. (component B) with respect to the polyester (component A), as the major component of the polyester-based long fibers, is preferably 0.1 wt % to 3.0 wt %, more preferably 0.25% to 2.5 wt % and even more preferably 0.5 wt % to 2.0 wt %, from the standpoint of spinnability and of the breaking elongation of the obtained nonwoven fabric. If the amount of addition of the polyacrylate-based resin is within the specified range it will be easier to obtain fibers with high ductility, frequent yarn breakage will be less likely to occur during spinning, and stable and continuous fibers will be obtained with improved productivity, while there will also be less tendency toward fouling of the stretching apparatus by fumes or dispersion of the polyacrylate-based resin of the yarn during spinning, and local exposure of the core material after molding due to stretch irregularities will be less likely to occur.

The polyester (component A) and the thermoplastic resin with a glass transition point temperature of 114° C. to 160° C. (component B) preferably form a sea-island structure with component A forming the sea portions and component B forming the island portions. While it is not our desire to be constrained by any particular theory, it is conjectured that this is because component B transitions from a molten state to a glassy state before component A, thus completing its stretching, so that stretching and oriented crystallization of component A which forms the sea portions is inhibited. Oriented crystallization of the sea portions is therefore reduced, so that stretching is completed with low crystallinity and fibers with high ductility are obtained. The glass transition point temperature of component B must therefore be higher than the glass transition point temperature of component A. The glass transition point temperature of component B is preferably 160° C. or below to reduce the likelihood of frequent yarn breakage. Considering that the glass transition point temperature of PET is 70° C. to 80° C., the glass transition temperature of component B may be 114° C. to 160° C., and is preferably 120° C. to 130° C.

When component B is added, the spinning speed for obtaining a continuous long fiber layer (S) is preferably 3000 m/min to 8000 m/min, and more preferably 4000 m/min to 6000 m/min. A high spinning speed will tend to increase the effect of creating high ductility by addition of component B. If it is 3000 m/min or higher it will be possible to inhibit oriented crystallization, and also to obtain an adequate effect of increasing the breaking elongation of the nonwoven fabric and to obtain adequate mechanical properties. If it is 8000 m/min or lower, on the other hand, fibers with high ductility can be obtained, and it will be possible to inhibit yarn breakage during spinning and to improve the productivity of the nonwoven fabric.

The method of limiting the birefringence Δn to the range of 0.04 to 0.07 may be a method of controlling the spinning speed. When component B is not added, the spinning speed for obtaining a continuous long fiber layer (S) is preferably 3000 m/min to 4000 m/min, and more preferably 3200 m/min to 3700 m/min. If the spinning speed is within this range, an inhibiting effect against oriented crystallization can be obtained, the effect of increasing the breaking elongation of the nonwoven fabric will be significant, fibers with high ductility will tend to result, and the mechanical properties will be more likely to be adequate.

The mean fiber size of the long fibers composing the continuous long fiber layer (S) is 10.0 μm to 30.0 μm, preferably 12.0 μm to 30.0 μm, more preferably 12.0 μm to 20.0 μm, even more preferably 13.0 μm to 20.0 μm and most preferably 13.0 μm to 18.0 μm. It is 10.0 μm or larger from the viewpoint of spinning stability, and 30 μm or smaller from the viewpoint of strength and heat resistance. If the mean fiber size of the long fibers is within the specified range, the crystallinity of the fibers will not be excessively high, they will have fewer crystal portions, the ductility of the fibers will increase, the moldability will tend to be satisfactory, heat shrinkage will be less likely to occur during partial thermocompression bonding, and the fibers will be unlikely to melt by the heat of the thermocompression bonding roll and to be taken up by the roll, and therefore the productivity of the nonwoven fabric will be satisfactory, the covering property will improve, the nonwoven fabric strength will increase and the spinning stability will be satisfactory.

The nonwoven fabric of this embodiment must include at least one ultrafine fiber layer (M). This is because without an ultrafine fiber layer it is impossible to form a compact structure with small fiber voids, and the wavelength of infiltrating sound is reduced due to friction resistance in the pores, thereby preventing control of the sound absorption property.

The ultrafine fiber layer (M) is preferably produced by melt blowing, which has relatively low production cost. The mean fiber size of the ultrafine fiber layer (M) is 0.3 μm to 7 μm, preferably 0.4 μm to 5 μm and more preferably 0.6 μm to 2 μm. Stringent conditions are needed for spinning to a fiber size of less than 0.3 μm by melt blowing, and stable fibers cannot be obtained. With a fiber size of greater than 7 μm, on the other hand, which is close to the fiber size of the continuous long fibers, they fail to function as microfilaments to enter and fill the voids of the continuous long fiber layer (S), and it becomes impossible to obtain a compact structure.

For compositing with a porous material having relatively low density and numerous voids, for use as the sound-absorbing material, it is desirable for the nonwoven fabric skin material disposed on the sound source side to have greater compactness, but in methods that increase the density by excessive full-surface joining to create compactness, the surface area of the fibers decreases due heat fusion, thus lowering thermal energy conversion caused by friction between the sound and fibers. It is therefore preferable for greater compactness to be achieved by forming finer fibers, rather than by increasing the density through excessive full-surface joining.

The basis weight of the ultrafine fiber layer (M) is 1 g/m$^2$ to 40 g/m$^2$, preferably 2 g/m$^2$ to 25 g/m$^2$ and more preferably 3 g/m$^2$ to 20 g/m$^2$, from the viewpoint of obtaining an adequate sound absorption property with a low basis weight.

The material used for the ultrafine fiber layer (M) may be any of the same thermoplastic synthetic resins usable for the continuous long fiber layer (S) described above.

When the material of the ultrafine fiber layer (M) is PET or a copolymer thereof, the solution viscosity (ηsp/c) of the ultrafine fibers is preferably 0.2 to 0.8 and more preferably 0.2 to 0.6. With PET melt-blown ultrafine fibers, crystallization is slower compared to other synthetic fibers and the voids in the continuous long fiber layer can be infiltrated while in a low-crystalline fluid state, thus allowing the voids between the fibers of the continuous long fiber layer to be filled to obtain a compact structure.

The shapes of the fiber cross-sections of the continuous long fiber layer (S) and ultrafine fiber layer (M) of the nonwoven fabric are not particularly restricted, but from the viewpoint of strength they are preferably circular cross-sections, while from the viewpoint of increasing the surface area of the fibers and forming microvoids, they are preferably atypical cross-sections, as in flat yarn. The nonwoven fabric of this embodiment includes at least one ultrafine fiber layer (M) and includes at least one continuous long fiber layer (S), so that the constituent fibers and each layer have stretchability. The ultrafine fiber layer (M) and continuous long fiber layer (S) preferably have a layered structure such as an SM-type or SMS-type structure. From the viewpoint of homogeneity, a plurality of ultrafine fiber layers may be stacked, as in an SMM layer or SMMS layer. Fine fibers generally lack rigidity and are prone to breakage when stretched, and therefore when producing an ultrafine fiber layer it is common to increase the self-adhesion in order to improve the spinnability, which includes preventing blowing away of the yarn, and in order to improve the strength and handleability, but this strengthens constraint between the fibers and lowers their freedom of movement, making them resistant to elongation. For this embodiment, the continuous long fiber layer plays a major role in making excessive stress less likely to act on the ultrafine fiber layer during stretching, allowing the ultrafine fiber layer to be homogeneously stretched and allowing stretchability to be exhibited by the nonwoven fabric as a whole.

When the ultrafine fiber layer of the nonwoven fabric of this embodiment is formed by melt blowing, it is rendered fine by blowing with heated air during melt blowing, and is formed into a sheet on a conveyor net that is being drawn in from the back side, or on a collecting surface on the continuous long fiber layer, utilizing self-adhesion resulting from fusion between the fibers that are being blasted at high temperature. When fine fibers are formed by a melt blowing method, therefore, self-adhesion due to fusion between the fibers usually increases in strength, which results in a phenomenon in which they become film-like, so that when they are stretched during molding the ultrafine fiber layer fails to loosen and becomes cracked. After researching this issue, however, the present inventors have found that by setting a predetermined distance as the distance between the melt blow nozzle and the collecting surface, it is possible to control the degree of self-adhesion caused by fusion when forming fine fibers, as described in detail below.

The indicator used for self-fusion may be the bulk density of the ultrafine fiber layer in the layered nonwoven fabric that has been integrated by thermocompression bonding. The thickness of the ultrafine fiber layer at the non-contact-bonded sections can be directly measured by image analysis of a cross-sectional photograph taken with a scanning electron microscope (SEM), and the bulk density can be calculated from the average basis weight of the ultrafine fiber layer and the thickness of the ultrafine fiber layer. When the basis weight cannot be calculated using the ultrafine fiber layer alone, an X-ray CT image of the nonwoven fabric may be taken and the bulk density can be calculated from the area of the observed region, the volume occupied by the ultrafine fiber layer, the resin density and the thickness, based on the X-ray CT image. The X-ray CT image of the nonwoven fabric can be taken using a nano3DX high-resolution 3D X-Ray Microscope (Rigaku Corp.). The bulk density of the ultrafine fiber layer (M) is 0.35 g/cm$^3$ to 0.70 g/cm$^3$, preferably 0.40 g/m$^3$ to 0.65 g/cm$^3$ and more preferably 0.4 g/cm$^3$ to 0.6 g/cm$^3$. If it is lower than 0.7 g/cm$^3$, a film-like form will be less likely to result, and when stretched during molding, the phenomenon in which the ultrafine fiber layer fails to loosen and becomes cracked will be less likely to occur. If it is 0.35 g/cm$^3$ or higher, the self-adhesion of fusion will not be too weak, and this will tend to avoid difficulty in handling during the layering step.

The bulk density of the ultrafine fiber layer (M) referred to here differs from the bulk density that is generally estimated from the basis weight of the nonwoven fabric as a whole and the amount of yarn. The ultrafine fiber layer (M) has a controlled degree of self-adhesion between the fibers, which is obtained not simply by calculation from the nonwoven fabric structure and material, but by actual direct measurement of the thickness of the ultrafine fiber layer. Therefore, the bulk density of the ultrafine fiber layer (M) is not simply estimated from the overall basis weight, thickness and bulk density of the SMS nonwoven fabric, for example.

The distance between the melt blow nozzle and collecting surface may be adjusted to adjust the bulk density of the ultrafine fiber layer (M) to 0.35 g/cm$^3$ to 0.70 g/cm$^3$. The distance between the melt blow nozzle and the collecting surface cannot be specified for all cases, since it should be appropriately selected depending on conditions such as the heated air temperature and flow rate and conditions such as the basis weight and conveying speed of the ultrafine fiber layer, but a distance of 100 mm to 200 mm is preferred, 110 mm to 180 mm is more preferred and 120 mm to 150 mm is even more preferred. If the distance between the melt blow nozzle and collecting surface is greater than 100 mm, the ultrafine fibers will less easily form a film even if the temperature and flow rate of the heated air is increased, and the ultrafine fiber layer will be less likely to fail to loosen and undergo cracking when it is stretched during molding. If the distance is 200 mm or smaller, entanglement between the fibers in air will be less likely to occur and marks will be less likely to be generated, while the self-adhesion of fusion will not be too weak, and handleability during the layering step will be satisfactory.

Each of the nonwoven fabric layers composing the nonwoven fabric of this embodiment is integrated by thermocompression bonding. They may be joined together by heating and contact bonding between a publicly known embossing roll and smooth roll, or between a smooth roll and smooth roll, for example, and most preferably they are joined by heating and contact bonding between an embossing roll and smooth roll. Partial thermocompression bonding is preferably carried out with a contact bonding area ratio in the range of 6% to 30% and more preferably 7% to 25%, with respect to the total area of the nonwoven fabric. If the thermocompression bonding area ratio is 6% or greater, generation of fluff will be reduced, and if it is 30% or lower, the nonwoven fabric will be unlikely to be paper-like, and the mechanical properties such as breaking elongation and tearing strength will be unlikely to be impaired. If the contact bonding area ratio is within this range it will be possible to satisfactorily carry out thermocompression bonding between the fibers, and a nonwoven fabric with suitable mechanical strength, rigidity and dimensional stability can be obtained.

The shapes of the thermocompression bonded sections are not particularly restricted, but preferred examples are a texture pattern, IL pattern (rectangular), pinpoint pattern, diamond pattern, quadrilateral pattern, hexagonal pattern, elliptical pattern, lattice pattern, polka dot pattern or round pattern.

The distances between the (partial) thermocompression bonded sections transferred to the nonwoven fabric by thermocompression bonding are preferably in the range of 0.6 mm to 3.5 mm, more preferably 0.8 mm to 3.4 mm and even more preferably 1 mm to 3 mm, both in the MD (machine direction) of the nonwoven fabric and the CD (cross direction) which is perpendicular to it. If the distances between the thermocompression bonded sections are within this range it will be possible to reduce any excessive increase in rigidity of the nonwoven fabric, and to adequately inhibit a phenomenon in which threads with a higher degree of freedom that are not contact bonded tend to separate from the contact-bonded sections and produce fluff. Bonding between the ultrafine fiber layer (M) and continuous long fiber layer (S) at the non-contact-bonded sections will also be adequate, allowing excellent sound absorption performance to be exhibited. If the distance between the thermocompression bonded sections is not too narrow, fluffing will be prevented, the rigidity will not be too high, shifting that occurs during molding with a hot press will not be too great, the molding workability will be satisfactory, excessive bonding between the ultrafine fiber layer (M) and continuous long fiber layer (S) at the non-contact-bonded sections will be reduced, and infiltration of sound will be less likely to be inhibited. If the distance between thermocompression bonded sections is not too wide, then the rigidity of the nonwoven fabric will not be too low, the molding workability will be satisfactory, fluffing will be less likely to occur, bonding will be satisfactory between the ultrafine fiber layer (M) and continuous long fiber layer (S) at the non-contact-bonded sections, and greater improvement will be obtained in the sound absorption performance by vibration of the continuous long fiber layer (S).

The temperature during thermocompression bonding cannot be specified for all cases as it should be appropriately selected depending on conditions such as the basis weight and speed of the supplied web, but it is preferably a temperature of 30° C. to 90° C. lower, and more preferably 40° C. to 70° C. lower, than the melting point of the resin forming the long fibers. When joining is by heating and contact bonding between an embossing roll and smooth roll, and the type of resin contacting with the embossing roll surface and the type of resin contacting with the flat roll surface are the same, the temperature difference between the embossing roll and the flat roll is preferably less than 10° C., more preferably less than 5° C. and even more preferably less than 3° C. This does not apply, however, when the melting points of the resin contacting with the embossing roll surface and the resin contacting with the flat roll surface are different, or when the spinning speeds or yarn orientations and crystallinity are different. If the temperature difference between the embossing roll and flat roll is within the range specified above, fluffing will be unlikely on the side with the low roll temperature, fluffing due to molding can also be reduced, yarn shifting from the thermocompression bonded sections due to fluffing can be minimized when stretching takes place during molding, stress concentration at the sections where yarn has shifted will be less likely, thus reducing stretch irregularities, exposure of the sound-absorbing base material can be prevented, and bonding between the ultrafine fiber layer (M) and continuous long fiber layer (S) will be sufficient at the non-contact-bonded sections, thereby resulting in greater improvement in the sound absorption performance due to vibration of the continuous long fiber layer (S). If the temperature difference is not excessively large, then heat resistance defects due to a lack of heat on one side will be unlikely to occur. When a difference in roll temperatures exists, the stress can be reduced during stretching to improve the moldability.

The pressure during thermocompression bonding likewise cannot be specified for all cases as it should be appropriately selected depending on conditions such as the basis weight and speed of the supplied web, but it is preferably 10 N/mm to 100 N/mm and more preferably 30 N/mm to 70 N/mm, as this range will allow satisfactory thermocompression bonding to be carried out between the fibers, and can yield a nonwoven fabric with suitable mechanical strength, rigidity and dimensional stability.

The grade of fluff on at least one side of the nonwoven fabric of this embodiment is preferably grade 3 or higher, and more preferably grade 3.5 or higher. If the fluff grade is 3 or higher it will be adequately able to withstand handling in the molding step, and loss of embossing marks or generation of fluff after molding can be inhibited.

The difference in the grade of fluff between the front and back sides of the nonwoven fabric of this embodiment is preferably less than grade 0.5, and more preferably less than grade 0.3. If the difference in fluff grade is less than grade 0.5, then when the fabric is stretched during molding, it will be less prone to stress concentration and creation of stretch irregularities at locations where the yarn tends to separate from the thermocompression bonded sections due to fluff on the side with the lower fluff grade, and therefore exposure of the sound-absorbing base material will tend to be inhibited. However, this does not apply if stretch irregularities are not a concern.

The basis weight of the nonwoven fabric of this embodiment is preferably 20 $g/m^2$ to 150 $g/m^2$, more preferably 25 $g/m^2$ to 130 $g/m^2$ and even more preferably 30 $g/m^2$ to 100 $g/m^2$. If the basis weight is 20 $g/m^2$ or greater, the amount of fibers will not be too small, the homogeneity and denseness of the nonwoven fabric will be improved, and suitable voids will be obtained. If the basis weight is 150 $g/m^2$ or lower, a suitable compact structure will be obtained, the rigidity will tend not to be too high, the moldability will be satisfactory, the handleability will be improved and cost will be lowered.

The thickness of the nonwoven fabric of this embodiment is preferably 2 mm or smaller, more preferably 0.1 mm to 2.0 mm, even more preferably 0.2 mm to 1.8 mm and most preferably 0.2 mm to 1.5 mm. If the thickness of the nonwoven fabric is within this range, the thermocompression bonding will be sufficient, and the phenomenon whereby yarn with a high degree of freedom separates from the contact-bonded sections and produces fluff will be unlikely to occur, while it will also be possible to achieve reduced space as a vehicle member, and will result in suitable rigidity, reduced wrinkle formation when the nonwoven fabric is layered, satisfactory handleability, sufficient flexibility of the sound-absorbing material when it is worked into various shapes, thus improving the workability, and no excessive collapse of the nonwoven fabric, so that an air layer can be adequately ensured in the continuous long fiber layer and a high sound absorption property can be easily obtained.

The bulk density of the entire nonwoven fabric of this embodiment is preferably 0.1 g/cm$^3$ to 0.7 g/cm$^3$, more preferably 0.15 g/cm$^3$ to 0.6 g/cm$^3$ and even more preferably 0.2 g/cm$^3$ to 0.55 g/cm$^3$. If the bulk density is 0.1 g/cm$^3$ or greater, the denseness of the nonwoven fabric will increase and the sound-reducing effect will be improved. If the bulk density is 0.7 g/cm$^3$ or lower, the nonwoven fabric will not have excessive denseness or too few voids, infiltration of sound will be sufficient, the sound absorption coefficient will be unlikely to decrease especially near mid frequencies of 4000 Hz, and the workability will be improved.

The air permeability of the nonwoven fabric of the embodiment, as measured by the Frajour method of JIS L 1906, is preferably 100 mL/cm$^2$/sec or lower, more preferably 0.1 mL/cm$^2$/sec to 50 mL/cm$^2$/sec and even more preferably 0.5 mL/cm$^2$/sec to 30 mL/cm$^2$/sec. If the air permeability is 100 mL/cm$^2$/sec or lower, the wavelength of infiltrating sound can be reduced and an effect of lowering sound energy can be easily obtained.

The rate of increase in the air permeability of the nonwoven fabric of this embodiment (where the area development rate in an atmosphere at 150° C. compared to the air permeability before simultaneous biaxial stretching using a simultaneous biaxial stretching machine is defined 200%) is less than 250%, more preferably less than 225% and even more preferably less than 200%. If the rate of increase in the air permeability before and after simultaneous biaxial stretching is less than 250%, defects such as cracking and pinholes in the ultrafine fiber layer will be less likely to occur, and partial torn sections will also be less likely to form.

The sum of the maximum stress in the MD direction and the maximum stress in the CD direction for the long fiber nonwoven fabric of this embodiment, when stretched at an area development rate of 200% in an atmosphere of 150° C. using a simultaneous biaxial stretching machine, is 10 N to 55 N, preferably 15 N to 50 N and more preferably 15 N to 45 N. If it is less than 55 N, the moldability will be improved, and generation of wrinkles in the recesses and irregularities in the sound-absorbing base material after molding will be eliminated, making it easier to obtain the desired structure. If it is 10 N or greater, contact bonding of the embossed sections will be adequate and fluff will be less likely to be generated. The sum of the maximum stress in the MD direction and the maximum stress in the CD direction with stretching at an area development rate of 200% was determined by measuring the maximum stress during stretching to 9.94 cm in both the MD and CD directions using a simultaneous biaxial stretching machine in an atmosphere at 150° C., with a holding distance of 24 cm×24 cm.

The dry heat shrinkage of the nonwoven fabric of this embodiment during 10 minutes in an atmosphere of 180° C. is preferably no greater than 5%, more preferably no greater than 4% and even more preferably no greater than 3.5%. If it does not exceed 5% then notable formation of wrinkles by contraction during molding will be unlikely to occur.

The layered nonwoven fabric of this embodiment has a compact structure with a very low degree of air permeability and, in terms of fiber structure, having small fiber voids (pores), sound infiltrating into the fiber voids (pores) is sound of reduced amplitude due to the friction resistance in the pores, and the vibrational sound energy is converted to thermal energy by friction with the ultrafine fibers, such that when it is used as a skin material it exhibits an effect of drastically improving the sound absorption property of the sound-absorbing base material.

The structure of the layered nonwoven fabric may comprise at least two ultrafine fiber layers (M), with one or more continuous long fiber layers (S) disposed between the ultrafine fiber layers (M). With the layered nonwoven fabric of this embodiment, the ultrafine fiber layers (M) convert vibrational sound energy into thermal energy by friction with the ultrafine fibers, providing an effect of improving the sound absorption property of the sound-absorbing base material. The air layer of the sparse continuous long fiber layer (S) which is a feature of the nonwoven fabric of this embodiment acts as a spring similar to a rear air layer, thereby causing more efficient vibration of the air in the ultrafine fiber layers (M) and producing friction between the air and ultrafine fibers in the ultrafine fiber layers (M) so that vibrational sound energy is converted into thermal energy, and an effect of improving the sound absorption property of the sound-absorbing base material is exhibited. This can also help conversion of sound that has been reflected without being absorbed by the sound-absorbing base material, back into thermal energy by the same effect when it passes back through the layered nonwoven fabric of this embodiment.

The layered nonwoven fabric of this embodiment preferably has two or more layers of the nonwoven fabric, in an SM-type or SMS-type layered structure integrated by thermocompression bonding. Integration by thermocompression bonding can easily produce a layered structure.

The method for integrating the continuous long fiber layer (S) between the ultrafine fiber layers (M) may be a method of integrating by using a flat-plate hot press, or sheath-core fibers containing a bonding agent such as a hot-melt agent, or a low-melting-point component, a method of integrating by ultrasonic welding, or a method of integrating by needle punching or mechanical entangling such as hydroentangling, for example, after partial thermocompression-bonded nonwoven fabrics having an SM-type or SMS-type layered structure have been fabricated and two or more of the nonwoven fabrics have been layered.

The distance between the ultrafine fiber layers (M) in the layered nonwoven fabric of this embodiment is preferably 30 μm to 200 μm, more preferably 40 μm to 180 μm and even more preferably 50 μm to 150 μm. If the distance between ultrafine fiber layers (M) is 30 μm or greater, the air layer of the continuous long fiber layer (S) will tend to be sufficient and a high sound absorption effect will tend to be obtained for the sound-absorbing base material. If it is 200 μm or smaller, adhesion between the nonwoven fabric layers will be sufficient and peeling will be unlikely to occur. If the distance between ultrafine fiber layers (M) is within this range, the air layer of the continuous long fiber layer (S) can be sufficiently ensured and a high sound absorption effect will be obtained for the sound-absorbing base material.

The distance between ultrafine fiber layers (M) can be obtained within this range by adjusting the amount of fibers and the fiber sizes in the continuous long fiber layer (S), the thickness based on the degree of contact bonding of each nonwoven fabric layer, and the pressure of the hot press during integration when the layered nonwoven fabric is fabricated.

At least one of the layers among the continuous long fiber layers (S) contacting with the sound-absorbing base material and/or the continuous long fiber layers (S) disposed between ultrafine fiber layers (M) in the layered nonwoven fabric of this embodiment preferably includes fibers having a melting point of at least 30° C. lower than the melting point of the fibers composing the ultrafine fiber layers (M). By using fibers having a melting point of at least 30° C. lower, it will be easier to bond between the nonwoven fabrics and to bond between the fibers in the layered nonwoven fabric and sound-absorbing base material.

Examples of fibers with low melting points to form the layered nonwoven fabric include polyolefin fibers such as low-density polyethylene, high-density polyethylene, polypropylene, copolymerized polyethylene and copolymerized polypropylene, aromatic polyester copolymers obtained by copolymerization of one or more compounds from among phthalic acid, isophthalic acid, sebacic acid, adipic acid, diethylene glycol and 1,4-butanediol with polyethylene terephthalate, polyester-based fibers such as aliphatic esters, and synthetic fibers such as copolymerized polyamides. Such fibers may be used alone or as composite mixed fibers with two or more types, or they may be composite mixed fibers comprising low melting point and high melting point fibers. Preferred low melting point fibers include composite fibers with a sheath-core structure, having a low-melting-point component as the sheath, examples of which include polyethylene terephthalate, polybutylene terephthalate, copolymerized polyesters, nylon 6, nylon 66 or copolymerized polyamides, having a high-melting-point component as the core, and low-density polyethylene, high-density polyethylene, polypropylene, copolymerized polyethylene, copolymerized polypropylene, copolymerized polyesters or aliphatic esters, having a low-melting-point component as the sheath.

The bonding between each of the layered nonwoven fabrics, i.e. between the ultrafine fiber layers (M) and continuous long fiber layers (S) or between the continuous long fiber layers (S), is preferably point bonding between the fibers of the layers composing the bonding surfaces. Point bonding is bonding between the surfaces of the fibers by thermal bonding using a heated roll or thermal bonding using low melting point fibers or a hot-melt material, or partial melting of the resin composing the fibers by ultrasonic welding to weld the fibers together. The state of point bonding can be confirmed by observing a cross-section of the layered nonwoven fabric with an SEM. Point bonding the fibers together causes the distances between bonded fibers to be non-uniform, so that when the fibers vibrate relative to each other they are subjected to different manners of vibration, easily producing a sound absorption effect. In a method of tangling and layering the fibers together, such as a method using a needle punch, the fibers of the nonwoven fabrics are not directly bonded and may therefore be less likely to be point bonded.

The skin material of this embodiment is effective as a reinforcing material for a sound-absorbing material, and can also be processed to impart surface functions such as black printability, water-repellency and flame retardance. Specifically, such treatment may be coloration treatment such as dyeing or printing, water repellency treatment with a fluororesin, additional processing with a thermosetting resin such as a phenol-based resin, thermosetting acrylic-based resin, melamine-based resin or epoxy-based resin, or flame retardant treatment with a phosphorus-based or other flame retardant.

The bulk density of the sound-absorbing base material to be used in a composite sound-absorbing material used as the skin material of this embodiment is preferably 0.01 g/cm$^3$ to 0.3 g/cm$^3$, more preferably 0.02 g/cm$^3$ to 0.25 g/cm$^3$, even more preferably 0.03 g/cm$^3$ to 0.2 g/cm$^3$ and yet more preferably 0.03 g/cm$^3$ to 0.1 g/cm$^3$. If the bulk density is 0.01 g/cm$^3$ or greater, the sound absorption property will be unlikely to be reduced and there will be no need to increase the thickness beyond the necessary level. If the bulk density is 0.1 g/cm$^3$ or lower, sounds passing through the nonwoven fabric skin material will readily infiltrate into the sound-absorbing base material, and the abrasion resistance and workability will be improved.

The sound-absorbing base material preferably has the specified bulk density in order to form a composite sound-absorbing material that has a high sound absorption property while also having a small thickness and light weight, and excellent shape stability, by combining a sound-absorbing base material and a skin material. The bulk density of the sound-absorbing base material can be adjusted by compression adjustment with a known hot press machine before combination with a nonwoven fabric or layered nonwoven fabric, or by compression adjustment during integral molding with the sound-absorbing base material after a synthetic fiber nonwoven fabric has been layered by thermoforming in a vehicle member.

The thickness of the sound-absorbing base material is preferably 5 mm to 50 mm and more preferably 10 mm to 40 mm. If the thickness is 5 mm or greater the sound absorption property will be adequate, and the sound absorption coefficient for low frequencies in particular will be less likely to be lowered. If the thickness is 50 mm or smaller, the size of the sound-absorbing material will not excessively increase and the laminating workability, handleability and product transportability will be improved.

Examples of materials for sound-absorbing base materials include open-cell resin foams made of polyethylene resin, polypropylene resin, polyurethane resin, polyester resin, acrylic resin, polystyrene resin or melamine resin, or sound-absorbing synthetic fiber nonwoven fabrics obtained by layering staple fibers and/or long fibers, including polyolefin-based fibers such as polyethylene, polypropylene and copolymerized polypropylene, polyamide-based fibers such as nylon 6, nylon 66 and copolymerized polyamide, polyester-based fibers such as polyethylene terephthalate, polybutylene terephthalate, copolymerized polyesters and aliphatic polyesters, composite fibers with a core-sheath structure comprising a combination of polyethylene, polypropylene or copolymerized polyester as the sheath and polypropylene or polyester as the core, or biodegradable fibers such as polylactic acid, polybutylene succinate or polyethylene succinate, with staple fibers or with staple fibers and long fibers, and tangling them by a known needle punching method, and felt. Examples of inorganic materials include glass fibers and glass wool. For improved moldability, these fiber-based base materials may also include a thermosetting resin such as phenol.

An open-cell resin foam is preferably a nonwoven fabric made of a melamine resin or urethane resin from the viewpoint of lightweight properties and sound absorption properties, and a sound-absorbing synthetic fiber nonwoven fabric is preferably made of polyester-based fibers from the viewpoint of flame retardance.

A composite sound-absorbing material using the skin material of this embodiment can be obtained by integrally joining the aforementioned nonwoven fabric or layered nonwoven fabric with a sound-absorbing base material having a coarse structure. Joining between the skin material and sound-absorbing base material may be by a method of insert heat-fusing fibers between the bonding surfaces, or a method of applying a hot-melt resin or bonding agent.

In a bonding method using a bonding agent, a hot-melt adhesive is applied onto the nonwoven fabric skin material by a curtain spray system, dot system or screen system at 2 g/m$^2$ to 30 g/m$^2$ and heated from the nonwoven fabric skin material side for softening and melting of the coated bonding agent, to allow bonding to the sound-absorbing base material.

The adhesive force between the skin material and sound-absorbing base material is preferably 0.1 N/10 mm or greater, and more preferably 0.2 N/10 mm to 5 N/10 mm. If the adhesive force is 0.1 N/10 mm or greater there will tend to be fewer problems such as detachment during cutting and transport of the sound-absorbing material. In order to obtain high adhesive force it is preferred to provide a low-melting-point component layer on the bonding surface of the nonwoven fabric skin material, and preferably a hot-melt bonding agent is coated onto the open-cell resin foam or fiber porous material.

A composite sound-absorbing material using the layered nonwoven fabric of this embodiment may be one with a sound absorption-contributing effect that is preferably 45% or greater, more preferably 50% or greater and even more preferably 55% or greater, as determined by the following formula from the mean sound absorption coefficient A (%) at frequencies of 1000 Hz, 1600 Hz, 2000 Hz, 2500 Hz, 3150 Hz and 4000 Hz, in measurement of normal incidence according to JIS-1405.

The sound absorption-contributing effect (%) is calculated by the following formula:

Sound absorption-contributing effect (%)=$A-A0$

{where A is the mean sound absorption coefficient A (%) for the composite sound-absorbing material and A0 is the mean sound absorption coefficient A (%) for the sound-absorbing base material alone}.

For a composite sound-absorbing material obtained by coating a 10 mm-thick continuous melamine resin foam "BASOTECT TG" by BASF Corp. with copolymerized polyester-based hot-melt powder (melting point: 130° C.) to 20 g/m$^2$, layering it with a nonwoven fabric before simultaneous biaxial stretching and joining them by heat treatment, when the typical frequencies of 1000 Hz, 1600 Hz, 2000 Hz, 2500 Hz, 3150 Hz and 4000 Hz according to JIS-1405 are measured using a normal incidence measuring device (Type 4206T by Bruel & Kjar Co.), placed so as to be incident from the skin material side, and the mean sound absorption coefficient A (%) is calculated, the sound absorption-contributing effect of the nonwoven fabric of this embodiment determined by the following formula is preferably 20% or higher, more preferably 25% or higher and even more preferably 30% or higher.

The sound absorption-contributing effect (%) is calculated by the following formula:

Sound absorption-contributing effect (%)=$A-A0$

{where A is the mean sound absorption coefficient A (%) for the composite sound-absorbing material and A0 is the mean sound absorption coefficient A (%) for the sound-absorbing base material alone}.

The sound absorption performance of "BASOTECT TG" melamine resin continuous foam by BASF Corp., having a thickness of 10 mm alone, was "1000 Hz: 11%, 1600 Hz: 14%, 2000 Hz: 18%, 2500 Hz: 20%, 3150 Hz: 24% and 4000 Hz: 31%, and mean sound absorption coefficient: 20%".

For a composite sound-absorbing material obtained by coating a 10 mm-thick continuous melamine resin foam "BASOTECT TG" by BASF Corp. with copolymerized polyester-based hot-melt powder (melting point: 130° C.) to 20 g/m$^2$, layering it with a nonwoven fabric either before or after simultaneous biaxial stretching and joining them by heat treatment, when the typical frequencies of 1000 Hz, 1600 Hz, 2000 Hz, 2500 Hz, 3150 Hz and 4000 Hz according to JIS-1405 are measured using a normal incidence measuring device (Type 4206T by Bruel & Kjar Co.), placed so as to be incident from the skin material side, and the mean sound absorption coefficient is calculated to determine the mean sound absorption coefficient (%) before simultaneous biaxial stretching and the mean sound absorption coefficient (%) after simultaneous biaxial stretching, the nonwoven fabric of this embodiment has a difference in sound absorption coefficient before and after simultaneous biaxial stretching (before stretching) of preferably less than 15%, more preferably 13% or lower and even more preferably 11% or lower. The effect of the sound absorption coefficient can be evaluated on the following scale.

G: <15%

P: ≥15%.

The present invention will now be explained in more specific detail through the following Examples and Comparative Examples, with the understanding that the invention is in no way limited thereby. The direction of flow during production of a nonwoven fabric (the machine direction) is referred to as the MD direction, and the width direction which is the direction perpendicular to that direction is referred to as the CD direction.

The physical properties for the Examples were obtained using the following methods. For the present invention, measurement is conducted by the following methods as a rule, but when circumstances do not allow measurement by these methods, appropriate reasonable alternative methods may be used.

(1) Glass Transition Point Temperature and Melting Point (° C.) of Thermoplastic Resin Component A 5 mg sample of each thermoplastic resin was taken, and a differential scanning calorimeter (Q100 by TA Instruments) was used to determine the glass transition point temperature as the temperature at the exothermic peak point and the melting point as the temperature at the endothermic peak point, with temperature increase from 20° C. to 290° C. at 10° C./min under a nitrogen atmosphere.

(2) Basis Weight (g/m$^2$)

The basis weight of the nonwoven fabric as a whole was measured according to JIS L 1913. The basis weight of each layer was the value calculated based on the production conditions for the Example. When the production conditions are unknown, the basis weight of each separable layer can be measured according to JIS L 1913, after removing each as a monolayer. When interlayer separation is not possible, an X-ray CT image of the nonwoven fabric may be taken and the calculation may be made from the area of the observed region, the volume occupied by the ultrafine fiber layer, the resin density and the thickness, based on the X-ray CT image.

(3) Mean Fiber Size (μm)

A VHX-700F microscope by Keyence Corp. was used to take a 500×-magnified photograph, and the average value for 10 fibers within the focus of the observation field was determined.

(4) Bulk Density (g/cm$^3$)

The ratio (basis weight)/(thickness) was calculated, and the weight per unit volume was determined.

(5) Thickness (mm)

This was determined according to JIS L 1913 B. The thickness under a pressure load of 0.02 kPa was measured at 3 or more locations, and the average value was determined. The thickness of the nonwoven fabric skin material was measured under a load of 20 kPa.

(6) Birefringence (Δn)

Yarn was sampled from the conveyor during the nonwoven fabric production process, and a Model BH2 polarizing microscope compensator by Olympus Corp. was used to determine the birefringence from the retardation and fiber size, based on the common interference pattern method. The average value for 10 fibers was calculated. When yarn cannot be sampled from above the conveyor during the nonwoven fabric production process, yarn sampled from the middle of the nonwoven fabric may be used for measurement of the birefringence by the method described above.

(7) Distance Between Ultrafine Fiber Layers (M) (μm)

After embedding the layered nonwoven fabric with an epoxy resin, an ultramicrotome was used to expose a cross-section perpendicular to the planar direction of the layered nonwoven fabric, a scanning electron microscope (VE-8800) by Keyence Corp. was used to take a cross-sectional photograph in the layered nonwoven fabric at 500× magnification, and then the distance between ultrafine fiber layers (M) was measured at 10 arbitrary points and the average value was calculated. In the case of ultrasonic welding, the measurement was made at non-welded parts.

(8) Biaxial Stretching Evaluation (Moldability)

A 26 cm×26 cm test piece is sampled, and a biaxial stretching machine (EX10-III) is used for simultaneous biaxial stretching by 9.94 cm in both the MD and CD directions at a stretching speed of 1000 m/min, after pre-heating for 90 seconds in an atmosphere of 150° C., with a grip length of 24 cm×24 cm (an area development rate of 200% is an area of 200% after stretching, where 100% is the original area), and the maximum stress in the MD and CD directions at that time is measured (average value for n=3). After visually examining the sample after stretching, evaluation was made on the following scale:

G: Torn sections, no stretch irregularities
F: Stretch irregularities
P: Torn sections or defects in the ultrafine fiber layer.

(9) Air Permeability: Measured by the Frazier Method Described in JIS L 1906.

(10) Abrasion Resistance (Fluff Grade) [Level]

Using a "Gakushin Color Fastness/Rubbing Tester" by Daiei Kagaku Seiki Mfg. Co., Ltd., with the nonwoven fabric as the sample, and using a No. 3 gold rubbing cloth and a load of 500 gf, friction at 100 passes, fluffing and the state of wear on the nonwoven fabric surface were visually evaluated on the following scale (average of n=5):

Grade 0: large damage
Grade 1: moderate damage
Grade 2: low damage
Grade 3: no damage, low fluff generation
Grade 4: no damage, slight fluff generation
Grade 5: no damage, no fluff.

(11) Bulk Density of Ultrafine Fiber Layer (g/cm$^3$)

A sample of the nonwoven fabric cut perpendicular to the planar direction is prepared, a scanning electron microscope (VE-8800) by Keyence Corp. is used to take a cross-sectional photograph of a non-contact-bonded section in the integrally thermocompression-bonded nonwoven fabric at 500× magnification, the thickness of the ultrafine fiber layer is measured at 10 arbitrary points, and the average value is calculated. The average basis weight of the ultrafine fiber layer determined in (2) is divided by the thickness of the ultrafine fiber layer. When the basis weight cannot be calculated using the ultrafine fiber layer alone, an X-ray CT image of the nonwoven fabric may be taken using a nano3DX High-Resolution 3D X-Ray Microscope (Rigaku), and the bulk density and basis weight can be calculated from the area of the observed region, the volume occupied by the ultrafine fiber layer, the resin density and the thickness, based on the X-ray CT image.

(12) Bonding Area Ratio (%) Between Ultrafine Fiber Layer (M) and Continuous Long Fiber Layer (S) (with Interlayer Separation in Nonwoven Fabric (Partial Thermocompression Bonded Nonwoven Fabric))

As shown in FIG. 1, the area ratio Ab where the ultrafine fiber layer (M) and the continuous long fiber layer (S1) and/or (S2) are essentially bonded at the non-partial thermocompression bonded sections was determined by cutting a non-partial thermocompression bonded section from the partial thermocompression bonded section with scissors, a cutter knife or the like, using adhesive tape (CT405AP-15 cellophane tape by Nichiban Co., Ltd.) to remove the fibers in the continuous long fiber layer (S1) or (S2) that were raised and not directly bonded with the ultrafine fiber layer (M), and then deriving the area value of each section partitioned by S layer fibers in the ultrafine fiber layer (M) that can be observed between the fibers of the continuous long fiber layer (S1) and/or (S2), from a surface photograph of the M layer at 200× magnification (see FIG. 2) taken using a scanning electron microscope (VE-8800) by Keyence Corp., using a polygonal area measuring system in measuring mode, calculating the total area, subsequently dividing the total area Sa by the total area St of the observation field and subtracting it from 1, and taking the average of the measurements at 10 arbitrary points. The phrase "measurement at 10 arbitrary points" means that ten 1 cm×1 cm test pieces are cut out randomly from a nonwoven fabric of arbitrary size, and measurement is conducted at one arbitrary location for each test piece. When continuous long fiber layers (S1, S2) are present on both sides of the nonwoven fabric, measurement is conducted on both sides and the average value is recorded as the measured value for one point. When the continuous long fiber layer (S1) is present only on one side, as in an SM structure, only the result for measurement on the continuous long fiber layer (S1) side is recorded as the measured value.

In other words, the bonding area ratio A between the ultrafine fiber layer (M) and the continuous long fiber layer (S) is determined by the following formula:

$$A = Aa + Ab$$

$$Ab = 100 \times (1 - (Sa/St)).$$

(With No Interlayer Separation of Nonwoven Fabric (Total-Surface-Bonded Nonwoven Fabric))

If the nonwoven fabric has no interlayer separation, then it is considered to be a total-surface-bonded nonwoven fabric, in which case the bonding area ratio is the area where the ultrafine fiber layer (M) and continuous long fiber layer (S1) or (S2) are essentially bonded. The area where the ultrafine fiber layer (M) and continuous long fiber layer (S1) or (S2) were essentially bonded was determined by deriving the area value of each section partitioned by S layer fibers in the ultrafine fiber layer (M) that can be observed between the fibers of the continuous long fiber layer (S1) and/or (S2), from a photograph of the nonwoven fabric surface taken at 200× magnification using a scanning electron microscope (VE-8800) by Keyence Corp., using a polygonal area measuring system in measuring mode, calculating the total area, subsequently dividing the total area Sa by the total area Sn of the observation field and subtracting it from 1, and taking the average of the measurements at 10 arbitrary points.

In other words, the bonding area ratio A between the ultrafine fiber layer (M) and continuous long fiber layer (S) is determined by the following formula:

$$A=100\times(1-Sa/Sn).$$

When the ultrafine fiber layer M cannot be observed in a photograph of the nonwoven fabric surface, the bonding area ratio is considered to be 100%.

(13) Dry Heat Shrinkage at 180° C. (%) (Shape Stability)

Using a hot air oven (HIGH-TEMP OVEN PHH-300 by Espec Corp.), three points of a 10 cm-square sample were exposed at 180° C.×30 minutes under a hot air atmosphere, and the area shrinkage factor (%) of the nonwoven fabric was measured.

(14) Mean Sound Absorption Coefficient A of Composite Sound-Absorbing Material Using Layered Nonwoven Fabric (%)

Using a normal incidence measuring device (Type 4206T by Bruel & Kjar Co.) according to JIS A 1405, the sound absorption coefficient A (%) was measured at the typical frequencies of 1000 Hz, 1600 Hz, 2000 Hz, 2500 Hz, 3150 Hz and 4000 Hz. The base material used was fabricated as described in the Examples and Comparative Examples.

(15) Sound Absorption-Imparting Effect for Nonwoven Fabric (%)

For a composite sound-absorbing material obtained by coating a 10 mm-thick continuous melamine resin foam "BASOTECT TG" by BASF Corp. with copolymerized polyester-based hot-melt powder (melting point: 130° C.) to 20 g/m², layering it with a nonwoven fabric before simultaneous biaxial stretching and joining them by heat treatment, when the typical frequencies of 1000 Hz, 1600 Hz, 2000 Hz, 2500 Hz, 3150 Hz and 4000 Hz according to JIS-1405 are measured using a normal incidence measuring device (Type 4206T by Bruel & Kjar Co.), placed so as to be incident from the skin material side, and the mean sound absorption coefficient A (%) is calculated, the sound absorption-contributing effect determined by the following formula is preferably 20% or higher, more preferably 25% or higher and even more preferably 30% or higher.

The sound absorption-contributing effect (%) is calculated by the following formula:

$$\text{Sound absorption-contributing effect (\%)}=A-A0$$

{where A is the mean sound absorption coefficient A (%) for the composite sound-absorbing material and A0 is the mean sound absorption coefficient A (%) for the sound-absorbing base material alone}.

The sound absorption performance of "BASOTECT TG" melamine resin continuous foam by BASF Corp., having a thickness of 10 mm alone, was "1000 Hz: 11%, 1600 Hz: 14%, 2000 Hz: 18%, 2500 Hz: 20%, 3150 Hz: 24% and 4000 Hz: 31%, and mean sound absorption coefficient: 20%".

(16) Mean Sound Absorption Coefficient (%) Before and after Simultaneous Biaxial Stretching For a composite sound-absorbing material obtained by coating a 10 mm-thick continuous melamine resin foam "BASOTECT TG" by BASF Corp. with copolymerized polyester-based hot-melt powder (melting point: 130° C.) to 20 g/m², layering it with nonwoven fabrics before and after simultaneous biaxial stretching and joining them by heat treatment, when the typical frequencies of 1000 Hz, 1600 Hz, 2000 Hz, 2500 Hz, 3150 Hz and 4000 Hz according to JIS-1405 were measured using a normal incidence measuring device (Type 4206T by Bruel & Kjar Co.), placed so as to be incident from the skin material side, the mean sound absorption coefficient was calculated to determine the mean sound absorption coefficient (%) before simultaneous biaxial stretching and the mean sound absorption coefficient (%) after simultaneous biaxial stretching. The difference in sound absorption coefficient before and after simultaneous biaxial stretching is evaluated on the following scale:

G: <15%
P: ≥15%.

EXAMPLES

Example 1

A polyethylene terephthalate resin (1% using orthochlorophenol, solution viscosity ηsp/c: 0.77 at 25° C., melting point: 263° C.) was supplied to a general purpose melt spinning apparatus and melted at 300° C., discharged from a spinning nozzle having a spinning hole with a circular cross-section, and stretched at a spinning speed of 3500 m/min using a high-speed airflow traction device with an air jet, while the yarn was cooled and trapped as a fiber web (S1) (basis weight: 11.6 g/m², mean fiber size: 15.3 μm) and shaped on a net, after which it was nipped between a smooth pre-compaction roll with a surface temperature of 160° C. and a conveyor net at a low pressure of 4 N/mm while gently preventing fluffing. Polyethylene terephthalate (solution viscosity ηsp/c: 0.50, melting point: 260° C.) was directly ejected onto the obtained continuous filament web (S1) from a melt blow nozzle, under conditions with a spinning temperature of 300° C., heated air at 320° C. and 1000 Nm³/hr, to form an ultrafine fiber web (M) (basis weight: 6.8 g/m², mean fiber size: 1.7 μm). During this step, the distance from the melt blow nozzle to the continuous long fiber layer was 110 mm, and the suction wind speed at the collecting surface directly under the melt blow nozzle was set to 7 m/sec. After shaping a polyethylene terephthalate continuous filament web (S2) over the obtained ultrafine fiber web in the same manner as the fiber web (S1) on a net, it was nipped between a smooth pre-compaction roll with a surface temperature of 160° C. and a conveyor net, at a low pressure of 4 N/mm, thus gently integrating each of the layers. The obtained layered web was then subjected to thermocompression bonding with a calender linear pressure of 30 N/mm, using a flat roll and an IL pattern embossing roll designed for a contact bonding area ratio during thermocompression bonding of 11.4%, and distances of 3.0 mm between thermocompression bonded sections in the MD direction and distances of 2.8 mm between thermocompression bonded sections in the CD direction, with the surface temperature of the embossing roll at 185° C. and the surface temperature of the flat roll at 185° C., to obtain a nonwoven fabric having a basis weight of 30 g/m² and a bulk density of 0.22 g/cm³. The physical properties of the obtained nonwoven fabric are shown in Tables 1 and 2.

Example 2

A nonwoven fabric was obtained in the same manner as Example 1, except that the contact bonding area ratio was 14%, and an embossing roll with a weave texture pattern was used so that the distances between thermocompression bonded sections in the MD direction was 0.7 mm and the distances between thermocompression bonded sections in the CD direction was 0.7 mm. The physical properties of the obtained nonwoven fabric are shown in Tables 1 and 2.

Example 3

A nonwoven fabric was obtained in the same manner as Example 1, except that the basis weights of the continuous filament webs (S1, S2) were each 15.4 g/m² and the basis weight of the ultrafine fiber web (M) was 9.2 g/m², the thermocompression bonded-section area ratio during thermocompression bonding was 8%, a pin-pattern embossing roll and a flat roll were used having distances of 3.4 mm between thermocompression bonded sections in the MD direction and distances of 3.4 mm between thermocompression bonded sections in the CD direction, the surface temperature of the embossing roll was 190° C., and the surface temperature of the flat roll was 190° C. The physical properties of the obtained nonwoven fabric are shown in Tables 1 and 2.

Example 4

A nonwoven fabric was obtained in the same manner as Example 1, except that the basis weights of the continuous filament webs (S1, S2) were each 10.4 g/m², polyethylene terephthalate (solution viscosity ηsp/c: 0.50, melting point: 260° C.) was directly ejected from a melt blow nozzle under conditions with a spinning temperature of 320° C., heated air at 360° C. and 1200 Nm³/hr, to form an ultrafine fiber web (M) (basis weight: 4.2 g/m², mean fiber size: 0.8 μm), with the distance from the melt blow nozzle to the continuous long fiber layer set to 120 mm, the surface temperature of the embossing roll set to 165° C. and the surface temperature of the flat roll set to 165° C. The physical properties of the obtained nonwoven fabric are shown in Tables 1 and 2.

Example 5

A nonwoven fabric was obtained in the same manner as Example 3, except that the basis weights of the continuous filament webs (S1, S2) were each 8.8 g/m², the basis weight of the ultrafine fiber web (M) was 7.5 g/m², the surface temperature of the embossing roll was 165° C. and the surface temperature of the flat roll was 165° C. The physical properties of the obtained nonwoven fabric are shown in Tables 1 and 2.

TABLE 1

| | | Example 1 | Example 2 | Example 3 | Example 4 | Example 5 |
|---|---|---|---|---|---|---|
| Upper layer (S1) | Resin type | PET | PET | PET | PET | PET |
| | Spinning speed (m/min) | 3500 | 3500 | 3500 | 3500 | 3500 |
| | Birefringence | 0.042 | 0.042 | 0.042 | 0.042 | 0.042 |
| | Fiber size (μm) | 15.3 | 15.3 | 15.3 | 15.3 | 15.3 |
| | Basis weight (g/m²) | 11.6 | 11.6 | 15.4 | 10.4 | 8.8 |
| Middle layer (M) | Resin type | PET | PET | PET | PET | PET |
| | Fiber size (μm) | 1.7 | 1.7 | 1.7 | 0.8 | 1.7 |
| | Basis weight (g/m²) | 6.8 | 6.8 | 9.2 | 4.2 | 7.5 |
| Lower layer (S2) | Resin type | PET | PET | PET | PET | PET |
| | Spinning speed (m/min) | 3500 | 3500 | 3500 | 3500 | 3500 |
| | Birefringence | 0.042 | 0.042 | 0.042 | 0.042 | 0.042 |
| | Fiber size (μm) | 15.3 | 15.3 | 15.3 | 15.3 | 15.3 |
| | Basis weight (g/m²) | 11.6 | 11.6 | 15.4 | 10.4 | 8.8 |
| Total basis weight (g/m²) | | 30 | 30 | 40 | 25 | 25 |
| Integration method | | Calender | Calender | Calender | Calender | Calender |
| Contact bonding area ratio (%) | | 11 | 14 | 8 | 11 | 8 |
| Emboss pattern | | IL | Weave texture | Pin | IL | Pin |
| Distance between contact-bonded sections (mm) | Machine direction | 3 | 0.7 | 3.4 | 3 | 3.4 |
| | Cross direction | 2.8 | 0.7 | 3.4 | 2.8 | 3.4 |
| Calender temperature (° C.) | Upper (embossing roll) | 185 | 185 | 190 | 165 | 165 |
| | Lower (flat roll) | 185 | 185 | 190 | 165 | 165 |
| Calender pressure (N/mm) | | 30 | 30 | 30 | 30 | 30 |
| Thickness (mm) | | 0.14 | 0.11 | 0.22 | 0.12 | 0.13 |
| Overall bulk density (g/cm³) | | 0.22 | 0.27 | 0.18 | 0.21 | 0.19 |
| Bonding area ratio of middle layer (M) and upper/lower layers (S1, S2) | | 57% | 63% | 53% | 49% | 46% |
| Middle layer (M) | Thickness (μm) | 16.2 | 14.5 | 21.5 | 9.5 | 17 |
| | Bulk density (g/cm³) | 0.42 | 0.47 | 0.43 | 0.44 | 0.44 |
| Air permeability (cc/cm²/sec) | | 55 | 36 | 45 | 12 | 54 |
| Sound absorption evaluation (%) | Mean sound absorption coefficient before stretching (%) | 41 | 48 | 52 | 47 | 40 |
| | Sound absorption-imparting effect (%) | 21 | 28 | 32 | 27 | 20 |
| | Evaluation | G | G | G | G | G |

TABLE 2

| | | Example 1 | Example 2 | Example 3 | Example 4 | Example 5 |
|---|---|---|---|---|---|---|
| Fluff grade | Embossing roll surface | 3.3 | 3.7 | 3.7 | 2.5 | 2.2 |
| | Flat roll surface | 3.4 | 3.9 | 3.9 | 2.7 | 2.4 |
| | Fluff grade difference | 0.1 | 0.2 | 0.2 | 0.2 | 0.2 |
| | 180° C. Dry heat contraction (%) | 3.4 | 3.2 | 3 | 3.9 | 3.9 |

TABLE 2-continued

|  |  | Example | | | | |
|---|---|---|---|---|---|---|
|  |  | 1 | 2 | 3 | 4 | 5 |
| Stress during biaxial stretching (150° C., 200% area development rate) | MD | 15.9 | 17.5 | 19.8 | 13.9 | 13.5 |
|  | CD | 5.5 | 6 | 7.1 | 4.9 | 4.3 |
|  | MD + CD | 21.4 | 23.5 | 26.9 | 18.8 | 17.8 |
| State of fabric after biaxial stretching | | G | G | G | G | G |
| Air permeability after biaxial stretching (cc/cm²/sec) | | 95 | 70 | 85 | 25 | 95 |
| Increase in air permeability before and after biaxial stretching | | 173% | 194% | 189% | 208% | 176% |
| Sound absorption evaluation (%) | Mean sound absorption coefficient after stretching (%) | 32 | 34 | 45 | 49 | 30 |
|  | Evaluation | G | G | G | G | G |

Example 6

A nonwoven fabric was obtained in the same manner as Example 2, except that the basis weights of the continuous filament webs (S1, S2) were each 20.8 g/m², and the basis weight of the ultrafine fiber web (M) was 8.4 g/m². The physical properties of the obtained nonwoven fabric are shown in Tables 3 and 4.

Example 7

A nonwoven fabric was obtained in the same manner as Example 6, except that the contact bonding area ratio during thermocompression bonding was 19%, a texture-pattern embossing roll and a flat roll were used having distances of 0.6 mm between thermocompression bonded sections in the MD direction and distances of 0.6 mm between thermocompression bonded sections in the CD direction, the surface temperature of the embossing roll was 200° C., and the surface temperature of the flat roll was 200° C. The physical properties of the obtained nonwoven fabric are shown in Tables 3 and 4.

Example 8

A polyethylene terephthalate resin (1% using orthochlorophenol, solution viscosity ηsp/c: 0.77 at 25° C., melting point: 263° C.) was supplied to a general purpose melt spinning apparatus and melted at 300° C., discharged from a spinning nozzle having a spinning hole with a circular cross-section, and stretched at a spinning speed of 3500 m/min using a high-speed airflow traction device with an air jet, while the yarn was cooled and shaped as a fiber web (S1) (basis weight: 11.6 g/m², mean fiber size: 15.3 μm) on a net, after which it was nipped between a smooth pre-compaction roll with a surface temperature of 160° C. and a conveyor net at a low pressure of 4 N/mm while gently preventing fluffing. Polyethylene terephthalate (solution viscosity ηsp/c: 0.50, melting point: 260° C.) was directly ejected onto the obtained continuous filament web (S1) from a melt blow nozzle, under conditions with a spinning temperature of 300° C., heated air at 320° C. and 1000 Nm³/hr, to form an ultrafine fiber web (M) (basis weight: 6.8 g/m², mean fiber size: 1.7 μm). During this step, the distance from the melt blow nozzle to the continuous long fiber layer was 110 mm, and the suction wind speed at the collecting surface directly under the melt blow nozzle was set to 7 m/sec. Next, a two-component spinning nozzle was used to form a continuous filament web (S2) (basis weight: 11.6 g/m², mean fiber size: 15.3 μm), of a copolymerized polyester resin (melting point: 208° C.) as the sheath component and a polyethylene terephthalate resin (melting point: 263° C.) as the core component, on a net, after which it was nipped between a smooth pre-compaction roll with a surface temperature of 120° C. and a conveyor net at a low pressure of 4 N/mm, gently integrating each of the layers. The obtained layered web was then subjected to thermocompression bonding with a calender linear pressure of 30 N/mm, using a flat roll and an IL pattern embossing roll designed for a contact bonding area ratio during thermocompression bonding of 11%, and distances of 3.0 mm between thermocompression bonded sections in the MD direction and distances of 2.8 mm between thermocompression bonded sections in the CD direction, with the surface temperature of the embossing roll at 185° C. and the surface temperature of the flat roll at 120° C., to obtain a nonwoven fabric having a basis weight of 30 g/m² and a bulk density of 0.22 g/cm³. The physical properties of the obtained nonwoven fabric are shown in Tables 3 and 4.

TABLE 3

|  |  | Example | | |
|---|---|---|---|---|
|  |  | 6 | 7 | 8 |
| Upper layer (S1) | Resin type | PET | PET | PET |
|  | Spinning speed (m/min) | 3500 | 3500 | 3500 |
|  | Birefringence | 0.042 | 0.042 | 0.042 |
|  | Fiber size (μm) | 15.3 | 15.3 | 15.3 |
|  | Basis weight (g/m²) | 20.8 | 20.8 | 11.6 |
| Middle layer (M) | Resin type | PET | PET | PET |
|  | Fiber size (μm) | 1.7 | 1.7 | 1.7 |
|  | Basis weight (g/m²) | 8.4 | 8.4 | 6.8 |
| Lower layer (S2) | Resin type | PET | PET | PET/CoPET |
|  | Spinning speed (m/min) | 3500 | 3500 | 3500 |
|  | Birefringence | 0.042 | 0.042 | 0.042 |
|  | Fiber size (μm) | 15.3 | 15.3 | 15.3 |
|  | Basis weight (g/m²) | 20.8 | 20.8 | 11.6 |

TABLE 3-continued

| | | Example | | |
|---|---|---|---|---|
| | | 6 | 7 | 8 |
| Total basis weight (g/m²) | | 50 | 50 | 30 |
| Integration method | | Calender | Calender | Calender |
| Contact bonding area ratio (%) | | 14 | 19 | 11 |
| Emboss pattern | | Weave texture | Weave texture | IL |
| Distance between contact-bonded sections (mm) | Machine direction | 0.7 | 0.6 | 3 |
| | Cross direction | 0.7 | 0.6 | 2.8 |
| Calender temperature (° C.) | Upper (embossing roll) | 185 | 200 | 185 |
| | Lower (flat roll) | 185 | 200 | 120 |
| Calender pressure (N/mm) | | 30 | 30 | 30 |
| Thickness (mm) | | 0.18 | 0.16 | 0.14 |
| Overall bulk density (g/cm³) | | 0.28 | 0.32 | 0.22 |
| Bonding area ratio of middle layer (M) and upper/lower layers (S1, S2) | | 70% | 79% | 63% |
| Middle layer (M) | Thickness (μm) | 16.5 | 15 | 21 |
| | Bulk density (g/cm³) | 0.51 | 0.56 | 0.45 |
| Air permeability (cc/cm²/sec) | | 13 | 12 | 53 |
| Sound absorption evaluation (%) | Mean sound absorption coefficient before stretching (%) | 52 | 51 | 42 |
| | Sound absorption-imparting effect (%) | 32 | 31 | 22 |
| | Evaluation | G | G | G |

TABLE 4

| | | Example | | |
|---|---|---|---|---|
| | | 6 | 7 | 8 |
| Fluff grade | Embossing roll surface | 3.7 | 4.4 | 3.6 |
| | Flat roll surface | 3.8 | 4.5 | 4 |
| | Fluff grade difference | 0.1 | 0.1 | 0.4 |
| 180° C. Dry heat contraction (%) | | 2.3 | 1.4 | 4.1 |
| Stress during biaxial stretching (150° C., 200% area development rate) | MD | 30.5 | 32.1 | 14.3 |
| | CD | 10.2 | 10.9 | 4.9 |
| | MD + CD | 40.7 | 43 | 19.2 |
| State of fabric after biaxial stretching | | G | G | G |
| Air permeability after biaxial stretching (cc/cm²/sec) | | 28 | 26 | 94 |
| Increase in air permeability before and after biaxial stretching | | 215% | 217% | 177% |
| Sound absorption evaluation (%) | Mean sound absorption coefficient after stretching (%) | 49 | 48 | 33 |
| | Evaluation | G | G | G |

Example 9

After mixing 98.5 wt % of a polyethylene terephthalate (PET) resin (1% using orthochlorophenol, solution viscosity ηsp/c: 0.77 at 25° C., melting point: 263° C.) and 1.5 wt % of an acrylate resin (methyl methacrylate/methyl acrylate binary copolymer, Product #: 80N, product of Asahi Kasei Corp.) as a dry blend, it was supplied to a general purpose melt spinning apparatus and melted at 300° C., discharged from a spinning nozzle having a spinning hole with a circular cross-section, and stretched at a spinning speed of 4500 m/min using a high-speed airflow traction device with an air jet, while the yarn was cooled and shaped as a fiber web (S1) (basis weight: 11.6 g/m², mean fiber size: 13.6 μm) on a net, after which it was nipped between a smooth pre-compaction roll with a surface temperature of 160° C. and a conveyor net at a low pressure of 4 N/mm while gently preventing fluffing. Polyethylene terephthalate (solution viscosity ηsp/c: 0.50, melting point: 260° C.) was directly ejected onto the obtained continuous filament web (S1) from a melt blow nozzle, under conditions with a spinning temperature of 300° C., heated air at 320° C. and 1000 Nm³/hr, to form an ultrafine fiber web (M) (basis weight: 6.8 g/m², mean fiber size: 1.7 μm). During this step, the distance from the melt blow nozzle to the continuous long fiber layer was 110 mm, and the suction wind speed at the collecting surface directly under the melt blow nozzle was set to 7 m/sec. After shaping a polyethylene terephthalate continuous filament web (S2) on the obtained ultrafine fiber web in the same manner as the fiber web (S1), it was nipped between a smooth pre-compaction roll with a surface temperature of 160° C. and a conveyor net, at a low pressure of 4 N/mm, thus gently integrating each of the layers. The obtained layered web was then subjected to thermocompression bonding with a calender linear pressure of 30 N/mm, using a flat roll and an IL pattern embossing roll designed for a thermocompression bonded-section area ratio during thermocompression bonding of 11%, and distances of 3.0 mm between thermocompression bonded sections in the MD direction and distances of 2.8 mm between thermocompression bonded sections in the CD direction, with the surface temperature of the embossing roll at 185° C. and the surface temperature of the flat roll at 185° C., to obtain a nonwoven fabric having a basis weight of 30 g/m² and a bulk density of 0.22 g/cm³. The physical properties of the obtained nonwoven fabric are shown in Tables 5 and 6.

Example 10

After mixing 99 wt % of a polyethylene terephthalate (PET) resin (1% using orthochlorophenol, solution viscosity ηsp/c: 0.77 at 25° C., melting point: 263° C.) and 1.0 wt % of a methacrylate resin (styrene/methyl methacrylate/cyclohexyl maleimide copolymer, Product #: PM130N, product of Asahi Kasei Corp.) as a dry blend, it was supplied to a general purpose melt spinning apparatus and melted at 300° C., discharged from a spinning nozzle having a spinning hole with a circular cross-section, and stretched at a spinning speed of 4500 m/min using a high-speed airflow traction device with an air jet, while the yarn was cooled and shaped as a fiber web (S1) (basis weight: 11.6 g/m², mean fiber size: 13.6 μm) on a net, after which it was nipped between a smooth pre-compaction roll with a surface temperature of 160° C. and a conveyor net at a low pressure of 4 N/mm while gently preventing fluffing. Polyethylene terephthalate (solution viscosity ηsp/c: 0.50, melting point: 260° C.) was directly ejected onto the obtained continuous filament web (S1) from a melt blow nozzle, under conditions with a spinning temperature of 300° C., heated air at 320° C. and 1000 Nm³/hr, to form an ultrafine fiber web (M) (basis weight: 6.8 g/m², mean fiber size: 1.7 μm). During this step, the distance from the melt blow nozzle to the continuous long fiber layer was 110 mm, and the suction wind speed at the collecting surface directly under the melt blow nozzle was set to 7 m/sec. After shaping a polyethylene terephthalate continuous filament web (S2) on the obtained ultrafine fiber web in the same manner as the fiber web (S1), it was nipped between a smooth pre-compaction roll with a surface temperature of 160° C. and a conveyor net, at a low pressure of 4 N/mm, thus gently integrating each of the layers. The obtained layered web was then subjected to thermocompression bonding with a calender linear pressure of 30 N/mm, using a flat roll and a texture-pattern embossing roll designed for a thermocompression bonded-section area ratio during thermocompression bonding of 14%, and distances of 0.7 mm between thermocompression bonded sections in the MD direction and distances of 0.7 mm between thermocompression bonded sections in the CD direction, with the surface temperature of the embossing roll at 185° C. and the surface temperature of the flat roll at 185° C., to obtain a nonwoven fabric having a basis weight of 30 g/m² and a bulk density of 0.27 g/cm³. The physical properties of the obtained nonwoven fabric are shown in Tables 5 and 6.

Example 11

A nonwoven fabric was obtained in the same manner as Example 10, except that the basis weights of the continuous filament webs (S1, S2) were each 15.4 g/m² and the basis weight of the ultrafine fiber web (M) was 9.2 g/m², the thermocompression bonded-section area ratio during thermocompression bonding was 8%, a pin-design embossing roll and a flat roll were used having distances of 3.4 mm between thermocompression bonded sections in the MD direction and distances of 3.4 mm between thermocompression bonded sections in the CD direction, the surface temperature of the embossing roll was 190° C., and the surface temperature of the flat roll was 190° C. The physical properties of the obtained nonwoven fabric are shown in Tables 5 and 6.

Example 12

A nonwoven fabric was obtained in the same manner as Example 10, except that the basis weights of the continuous filament webs (S1, S2) were each 10.4 g/m², polyethylene terephthalate (solution viscosity ηsp/c: 0.50, melting point: 260° C.) was directly ejected from a melt blow nozzle under conditions with a spinning temperature of 320° C., heated air at 360° C. and 1200 Nm³/hr, to form an ultrafine fiber web (M) (basis weight: 4.2 g/m², mean fiber size: 0.8 μm), with the distance from the melt blow nozzle to the continuous long fiber layer set to 120 mm, the thermocompression bonded-section area ratio during thermocompression bonding set to 11%, with an IL-pattern embossing roll and a flat roll having distances of 3.0 mm between thermocompression bonded sections in the MD direction and distances of 2.8 mm between thermocompression bonded sections in the CD direction, and with the surface temperature of the embossing roll set to 165° C. and the surface temperature of the flat roll set to 165° C. The physical properties of the obtained nonwoven fabric are shown in Tables 5 and 6.

Example 13

A nonwoven fabric was obtained in the same manner as Example 11, except that the basis weights of the continuous filament webs (S1, S2) were each 8.8 g/m², the basis weight of the ultrafine fiber web (M) was 7.5 g/m², the surface temperature of the embossing roll was 165° C. and the surface temperature of the flat roll was 165° C. The physical properties of the obtained nonwoven fabric are shown in Tables 5 and 6.

Example 14

A nonwoven fabric was obtained in the same manner as Example 10, except that the basis weights of the continuous filament webs (S1, S2) were each 20.8 g/m², and the basis weight of the ultrafine fiber web (M) was 8.4 g/m². The physical properties of the obtained nonwoven fabric are shown in Tables 5 and 6.

Example 15

A nonwoven fabric was obtained in the same manner as Example 14, except that the thermocompression bonded-section area ratio during thermocompression bonding was 19%, a texture-pattern embossing roll and a flat roll were used having distances of 0.6 mm between thermocompression bonded sections in the MD direction and distances of 0.6 mm between thermocompression bonded sections in the CD direction, the surface temperature of the embossing roll was 200° C., and the surface temperature of the flat roll was 200° C. The physical properties of the obtained nonwoven fabric are shown in Tables 5 and 6.

Example 16

After mixing 99 wt % of a polyethylene terephthalate resin (1% using orthochlorophenol, solution viscosity ηsp/c: 0.77 at 25° C., melting point: 263° C.) and 1.0 wt % of a methacrylate resin (styrene/methyl methacrylate/cyclohexyl maleimide copolymer, Product #: PM130N, product of Asahi Kasei Corp.) as a dry blend, it was supplied to a general purpose melt spinning apparatus and melted at 300° C., discharged from a spinning nozzle having a spinning hole with a circular cross-section, and stretched at a spinning speed of 4500 m/min using a high-speed airflow traction device with an air jet, while the yarn was cooled and shaped as a fiber web (S1) (basis weight: 11.6 g/m², mean fiber size: 13.6 μm) on a net, after which it was nipped between a smooth pre-compaction roll with a surface temperature of 160° C. and a conveyor net at a low pressure of 4 N/mm while gently preventing fluffing. Polyethylene terephthalate (solution viscosity ηsp/c: 0.50, melting point: 260° C.) was directly ejected onto the obtained continuous filament web (S1) from a melt blow nozzle, under conditions with a spinning temperature of 300° C., heated air at 320° C. and 1000 Nm³/hr, to form an ultrafine fiber web (M) (basis weight: 6.8 g/m², mean fiber size: 1.7 μm). During this step, the distance from the melt blow nozzle to the continuous long fiber layer was 110 mm, and the suction wind speed at the collecting surface directly under the melt blow nozzle was set to 7 m/sec. Next, a two-component spinning nozzle was used to form a continuous filament web (S2) (basis weight: 11.6 g/m², mean fiber size: 13.6 μm) comprising 99 wt % of a copolymerized polyester resin (melting point: 208° C.) and 1.0 wt % of a methacrylate resin (styrene/methyl methacrylate/cyclohexyl maleimide polymer, Product No. PM130N, by Asahi Kasei Corp.) as the sheath component, and 99 wt % of a polyethylene terephthalate resin (melting point: 263° C.) and 1.0 wt % of a methacrylate resin (styrene/methyl methacrylate/cyclohexyl maleimide polymer, Product No. PM130N, by Asahi Kasei Corp.) as the core component, on a net, and it was then nipped between a smooth pre-compaction roll with a surface temperature of 120° C. and a conveyor net, at a low pressure of 4 N/mm, gently integrating each of the layers. The obtained layered web was then subjected to thermocompression bonding with a calender linear pressure of 30 N/mm, using a flat roll and an IL pattern embossing roll designed for a thermocompression bonded-section area ratio during thermocompression bonding of 11.4%, and distances of 3.0 mm between thermocompression bonded sections in the MD direction and distances of 2.8 mm between thermocompression bonded sections in the CD direction, with the surface temperature of the embossing roll at 185° C. and the surface temperature of the flat roll at 120° C., to obtain a nonwoven fabric having a basis weight of 30 g/m² and a bulk density of 0.22 g/cm³. The physical properties of the obtained nonwoven fabric are shown in Tables 5 and 6.

TABLE 5

|  |  | Examples | | | |
| --- | --- | --- | --- | --- | --- |
|  |  | 9 | 10 | 11 | 12 |
| Upper layer (S1) | Component A starting material | PET | PET | PET | PET |
|  | Component B starting material | 80N | PM130N | PM130N | PM130N |
|  | Component B glass transition point (° C.) | 114 | 120 | 120 | 120 |
|  | Component B addition (wt %) | 1.5 | 1 | 1 | 1 |
|  | Spinning speed (m/min) | 4500 | 4500 | 4500 | 4500 |
|  | Birefringence | 0.042 | 0.041 | 0.041 | 0.041 |
|  | Fiber size (μm) | 13.6 | 13.6 | 13.6 | 13.6 |
|  | Basis weight (g/m²) | 11.6 | 11.6 | 15.4 | 10.4 |
| Middle layer (M) | Resin type | PET | PET | PET | PET |
|  | Fiber size (μm) | 1.7 | 1.7 | 1.7 | 0.8 |
|  | Basis weight (g/m²) | 6.8 | 6.8 | 9.2 | 4.2 |
| Lower layer (S2) | Component A starting material | PET | PET | PET | PET |
|  | Component B starting material | 80N | PM130N | PM130N | PM130N |
|  | Component B glass transition point (° C.) | 114 | 120 | 120 | 120 |
|  | Component B addition (wt %) | 1.5 | 1 | 1 | 1 |
|  | Spinning speed (m/min) | 4500 | 4500 | 4500 | 4500 |
|  | Birefringence | 0.042 | 0.041 | 0.041 | 0.041 |
|  | Fiber size (μm) | 13.6 | 13.6 | 13.6 | 13.6 |
|  | Basis weight (g/m²) | 11.6 | 11.6 | 15.4 | 10.4 |
| Total basis weight (g/m²) |  | 30 | 30 | 40 | 25 |
| Contact bonding area ratio (%) |  | 11 | 14 | 8 | 11.4 |
| Emboss pattern |  | IL | Weave texture | Pin | IL |
| Distance between contact-bonded sections (mm) | Machine direction | 3 | 0.7 | 3.4 | 3 |
|  | Cross direction | 2.8 | 0.7 | 3.4 | 2.8 |
| Calender temperature (° C.) | Upper (embossing roll) | 185 | 185 | 190 | 165 |
|  | Lower (flat roll) | 185 | 185 | 190 | 165 |
| Calender pressure (N/mm) |  | 30 | 30 | 30 | 30 |
| Thickness (mm) |  | 0.14 | 0.11 | 0.22 | 0.12 |
| Overall bulk density (g/cm³) |  | 0.22 | 0.27 | 0.18 | 0.21 |
| Bonding area ratio of middle layer (M) and upper/lower layers (S1, S2) |  | 59% | 66% | 55% | 51% |
| Middle layer (M) | Thickness (μm) | 16.2 | 14.5 | 21.5 | 9.5 |
|  | Bulk density (g/cm³) | 0.42 | 0.47 | 0.43 | 0.44 |
| Air permeability (cc/cm²/sec) |  | 53 | 34 | 43 | 12 |
| Sound absorption evaluation (%) | Mean sound absorption coefficient before stretching (%) | 43 | 50 | 54 | 46 |
|  | Sound absorption-imparting effect (%) | 23 | 30 | 34 | 26 |
|  | Evaluation | G | G | G | G |

|  |  | Examples | | | |
| --- | --- | --- | --- | --- | --- |
|  |  | 13 | 14 | 15 | 16 |
| Upper layer (S1) | Component A starting material | PET | PET | PET | PET |
|  | Component B starting material | PM130N | PM130N | PM130N | PM130N |
|  | Component B glass transition point (° C.) | 120 | 120 | 120 | 120 |
|  | Component B addition (wt %) | 1 | 1 | 1 | 1 |
|  | Spinning speed (m/min) | 4500 | 4500 | 4500 | 4500 |
|  | Birefringence | 0.041 | 0.041 | 0.041 | 0.041 |
|  | Fiber size (μm) | 13.6 | 13.6 | 13.6 | 13.6 |
|  | Basis weight (g/m²) | 8.8 | 20.8 | 20.8 | 11.6 |
| Middle layer (M) | Resin type | PET | PET | PET | PET |
|  | Fiber size (μm) | 1.7 | 1.7 | 1.7 | 1.7 |
|  | Basis weight (g/m²) | 7.5 | 8.4 | 8.4 | 6.8 |

TABLE 5-continued

| | | | | | |
|---|---|---|---|---|---|
| Lower layer (S2) | Component A starting material | PET | PET | PET | PET/CoPET |
| | Component B starting material | PM130N | PM130N | PM130N | PM130N |
| | Component B glass transition point (° C.) | 120 | 120 | 120 | 120 |
| | Component B addition (wt %) | 1 | 1 | 1 | 1 |
| | Spinning speed (m/min) | 4500 | 4500 | 4500 | 4500 |
| | Birefringence | 0.041 | 0.041 | 0.041 | 0.04 |
| | Fiber size (μm) | 13.6 | 13.6 | 13.6 | 13.6 |
| | Basis weight (g/m$^2$) | 8.8 | 20.8 | 20.8 | 11.6 |
| Total basis weight (g/m$^2$) | | 25 | 50 | 50 | 30 |
| Contact bonding area ratio (%) | | 8 | 14 | 19 | 11.4 |
| Emboss pattern | | Pin | Weave texture | Weave texture | IL |
| Distance between contact-bonded sections (mm) | Machine direction | 3.4 | 0.7 | 0.6 | 3 |
| | Cross direction | 3.4 | 0.7 | 0.6 | 2.8 |
| Calender temperature (° C.) | Upper (embossing roll) | 165 | 185 | 200 | 185 |
| | Lower (flat roll) | 165 | 185 | 200 | 120 |
| Calender pressure (N/mm) | | 30 | 30 | 30 | 30 |
| Thickness (mm) | | 0.13 | 0.18 | 0.16 | 0.18 |
| Overall bulk density (g/cm$^3$) | | 0.19 | 0.28 | 0.32 | 0.22 |
| Bonding area ratio of middle layer (M) and upper/lower layers (S1, S2) | | 47% | 72% | 80% | 65% |
| Middle layer (M) | Thickness (μm) | 17 | 16.5 | 15 | 21 |
| | Bulk density (g/cm$^3$) | 0.44 | 0.51 | 0.56 | 0.45 |
| | Air permeability (cc/cm$^2$/sec) | 52 | 12 | 11 | 51 |
| Sound absorption evaluation (%) | Mean sound absorption coefficient before stretching (%) | 43 | 54 | 51 | 42 |
| | Sound absorption-imparting effect (%) | 23 | 34 | 31 | 22 |
| | Evaluation | G | G | G | G |

TABLE 6

| | | Examples | | | | | | | |
|---|---|---|---|---|---|---|---|---|---|
| | | 9 | 10 | 11 | 12 | 13 | 14 | 15 | 16 |
| Fluff grade | Embossing roll surface | 3.5 | 3.6 | 4 | 2.9 | 2.7 | 3.7 | 4.4 | 3.6 |
| | Flat roll surface | 3.8 | 3.9 | 4 | 3 | 2.8 | 3.8 | 4.5 | 4 |
| | Fluff grade difference | 0.3 | 0.3 | 0 | 0.1 | 0.1 | 0.1 | 0.1 | 0.4 |
| 180° C. Dry heat contraction (%) | | 2.5 | 2.4 | 2.3 | 2.3 | 2.5 | 2.3 | 1.4 | 4.1 |
| Stress during biaxial stretching (150° C., 200% area development rate) | MD | 15.9 | 17.5 | 19.8 | 13.9 | 13.6 | 30.5 | 32.1 | 14.3 |
| | CD | 5.5 | 6 | 7.1 | 4.9 | 4.5 | 10.2 | 10.9 | 4.9 |
| | MD + CD | 21.4 | 23.5 | 26.9 | 18.8 | 18.1 | 40.7 | 43 | 19.2 |
| State of fabric after biaxial stretching | | G | G | G | G | G | G | G | G |
| Air permeability after biaxial stretching (cc/cm$^2$/sec) | | 90 | 66 | 80 | 24 | 91 | 25 | 23 | 90 |
| Increase in air permeability before and after biaxial stretching | | 170% | 194% | 186% | 200% | 175% | 208% | 209% | 176% |
| Sound absorption evaluation (%) | Mean sound absorption coefficient after stretching (%) | 34 | 36 | 47 | 49 | 32 | 50 | 49 | 34 |
| | Evaluation | G | G | G | G | G | G | G | G |

Example 17

Three nonwoven fabrics obtained as in Example 8 were layered and pressed with a hot plate at 150° C. to obtain a layered nonwoven fabric.

The sound-absorbing base material used was a continuous foam melamine resin layer with a thickness of 10 mm, a basis weight of 10 g/m$^2$ and a bulk density of 0.01 g/cm$^3$ (melamine resin continuous foam, BASOTECT TG by BASF Corp.), and it was joined with the aforementioned layered nonwoven fabric. The joining was by heating and pressurized heat treatment in an atmosphere with a temperature of 150° C. while sandwiched by a mesh-like conveyor belt, to obtain a composite sound-absorbing material of the invention. The physical properties of the obtained composite sound-absorbing material are shown in Table 7.

Example 18

A composite sound-absorbing material was obtained in the same manner as Example 17, except that the sound-absorbing base material used was one with a basis weight of 200 g/m$^2$, a thickness of 25 mm and a bulk density of 0.08 g/cm$^3$, obtained by open web formation by a carding method, with 70% polyester staple fibers (fiber size: 25 μm, fiber length: 51 mm) and 30% copolymerized polyester fibers (melting point: 135° C., fiber size: 15 μm, fiber length: 51 mm) and tangling by needle punching. The physical properties of the obtained composite sound-absorbing material are shown in Table 7.

The sound absorption performance of the sound-absorbing base material when used alone was "1000 Hz: 9%, 1600 Hz: 10%, 2000 Hz: 16%, 2500 Hz: 18%, 3150 Hz: 19% and 4000 Hz: 20%, and mean sound absorption coefficient: 16%".

Example 19

Three nonwoven fabrics obtained as in Example 1 were layered, a copolymerized polyester-based hot-melt powder (melting point: 130° C.) was coated between them to 10 g/m², and the stack was pressed with a hot plate at 150° C., to obtain a layered nonwoven fabric.

The sound-absorbing base material layer used was a continuous foam melamine resin layer with a thickness of 10 mm, a basis weight of 10 g/cm² and a bulk density of 0.01 g/cm³ (melamine resin continuous foam, BASOTECT TG by BASF Corp.), and it was joined with the aforementioned layered nonwoven fabric. The joining was by coating the copolymerized polyester-based hot-melt powder (melting point: 130° C.) to 10 g/m² between each layer on the sound-absorbing base material, inserting it between mesh-like conveyor belts and heating in an atmosphere at a temperature of 150° C. for joining by pressurized heat treatment to obtain a composite sound-absorbing material of the invention. The physical properties of the obtained composite sound-absorbing material are shown in Table 7.

Example 20

A composite sound-absorbing material was obtained in the same manner as Example 19, except that three nonwoven fabrics obtained as in Example 10 were layered and subjected to ultrasonic welding with a welding area ratio of 5%, to obtain a layered nonwoven fabric. The physical properties of the obtained composite sound-absorbing material are shown in Table 7.

Example 21

A composite sound-absorbing material was obtained in the same manner as Example 19, except that five nonwoven fabrics obtained as in Example 10 were layered and subjected to ultrasonic welding with a welding area ratio of 5%, to obtain a layered nonwoven fabric. The physical properties of the obtained composite sound-absorbing material are shown in Table 7.

Example 22

A composite sound-absorbing material was obtained in the same manner as Example 19, except that five nonwoven fabrics obtained as in Example 12 were layered and subjected to ultrasonic welding with a welding area ratio of 5%, to obtain a layered nonwoven fabric. The physical properties of the obtained composite sound-absorbing material are shown in Table 7.

TABLE 7

| | | | Examples | | | | | |
|---|---|---|---|---|---|---|---|---|
| | | | 17 | 18 | 19 | 20 | 21 | 22 |
| Nonwoven fabric | Upper layer (S1) | Resin type | PET | PET | PET | PET/PM130N | PET/PM130N | PET/PM130N |
| | | Fiber size (μm) | 15.3 | 15.3 | 15.3 | 13.6 | 13.6 | 13.6 |
| | | Basis weight (g/m²) | 11.6 | 11.6 | 11.6 | 11.6 | 11.6 | 10.4 |
| | Middle layer (M) | Resin type | PET | PET | PET | PET | PET | PET |
| | | Fiber size (μm) | 1.7 | 1.7 | 1.7 | 1.7 | 1.7 | 0.8 |
| | | Basis weight (g/m²) | 6.8 | 6.8 | 6.8 | 6.8 | 6.8 | 4.2 |
| | Lower layer (S2) | Resin type | PET/CoPET | PET/CoPET | PET | PET/PM130N | PET/PM130N | PET/PM130N |
| | | Fiber size (μm) | 15.3 | 15.3 | 15.3 | 13.6 | 13.6 | 13.6 |
| | | Basis weight (g/m²) | 11.6 | 11.6 | 11.6 | 11.6 | 11.6 | 10.4 |
| | Total basis weight (g/m²) | | 30 | 30 | 30 | 30 | 30 | 25 |
| | Partial thermocompression bonding rate (%) | | 11 | 11 | 11 | 14 | 14 | 11 |
| | Thickness (mm) | | 0.14 | 0.14 | 0.14 | 0.11 | 0.11 | 0.12 |
| | Overall bulk density (g/cm³) | | 0.22 | 0.22 | 0.22 | 0.27 | 0.27 | 0.21 |
| | Air permeability (cc/cm²/sec) | | 53 | 53 | 55 | 34 | 34 | 12 |
| Layered nonwoven fabric | Layer bonding method | | Heat seal hot press | Heat seal hot press | Hot-melt agent + hot press | Ultrasonic welding | Ultrasonic welding | Ultrasonic welding |
| | Number of layers | | 3 | 3 | 3 | 3 | 5 | 5 |
| | Total basis weight (g/m²) | | 90 | 90 | 110 | 90 | 150 | 125 |
| | Thickness (mm) | | 0.31 | 0.31 | 0.31 | 0.33 | 0.54 | 0.6 |
| | Overall bulk density (g/cm³) | | 0.29 | 0.29 | 0.35 | 0.27 | 0.27 | 0.21 |
| | Distance between ultrafine fiber layers (μm) | | 104 | 104 | 101 | 105 | 102 | 99 |
| Base material | Resin type | | Melamine | PET/CoPET | Melamine | Melamine | Melamine | Melamine |
| | Form | | Continuous resin foam | Staple fiber-NP nonwoven fabric | Continuous resin foam | Continuous resin foam | Continuous resin foam | Continuous resin foam |
| | Thickness (mm) | | 10 | 25 | 10 | 10 | 10 | 10 |
| | Bulk density (g/cm³) | | 0.01 | 0.08 | 0.01 | 0.01 | 0.01 | 0.01 |
| | Basis weight (g/m²) | | 10 | 200 | 10 | 10 | 10 | 10 |
| Joining | Joining type | | Heat seal hot press | Heat seal hot press | Hot-melt agent + hot press | Hot-melt agent + hot press | Hot-melt agent + hot press | Hot-melt agent+ hot press |
| | Basis weight (g/m²) | | 0 | 0 | 10 | 10 | 10 | 10 |

TABLE 7-continued

|  |  | Examples | | | | | |
|---|---|---|---|---|---|---|---|
|  |  | 17 | 18 | 19 | 20 | 21 | 22 |
| Sound absorbing layered body | Basis weight (g/m$^2$) | 100 | 320 | 130 | 110 | 170 | 145 |
|  | Thickness (mm) | 10.39 | 25.39 | 10.39 | 10.33 | 10.5 | 10.6 |
|  | Bulk density (g/cm$^3$) | 0.096 | 0.126 | 0.125 | 0.106 | 0.161 | 0.137 |
|  | Sound absorption (%) 1000 Hz | 18 | 16 | 17 | 19 | 31 | 29 |
|  | 1600 Hz | 48 | 39 | 49 | 52 | 80 | 68 |
|  | 2000 Hz | 70 | 58 | 71 | 74 | 97 | 94 |
|  | 2500 Hz | 97 | 78 | 97 | 96 | 92 | 96 |
|  | 3150 Hz | 98 | 98 | 96 | 82 | 78 | 82 |
|  | 4000 Hz | 85 | 91 | 81 | 77 | 65 | 72 |
|  | Mean sound absorption coefficient A (%) | 69 | 63 | 69 | 67 | 74 | 74 |

Comparative Example 1

Polyethylene terephthalate (solution viscosity ηsp/c: 0.50, melting point: 260° C.) was directly ejected from a melt blow nozzle, under conditions with a spinning temperature of 300° C., heated air at 320° C. and 1000 Nm$^3$/hr, to form an ultrafine fiber web (M) (basis weight: 6.8 g/m$^2$, mean fiber size: 1.7 μm). The physical properties of the obtained nonwoven fabric are shown in Tables 8 and 9.

Tearing occurred when the area development rate was 200% with a simultaneous biaxial stretching machine in an atmosphere at 150° C. Since the fabric was torn, it was not possible to measure the air permeability or sound absorption performance after stretching.

Comparative Example 2

Polyethylene terephthalate (solution viscosity ηsp/c: 0.50, melting point: 260° C.) was directly ejected from a melt blow nozzle, under conditions with a spinning temperature of 300° C., heated air at 320° C. and 1000 Nm$^3$/hr, to form an ultrafine fiber web (M) (basis weight: 10.0 g/m$^2$, mean fiber size: 1.7 μm). The physical properties of the obtained nonwoven fabric are shown in Tables 8 and 9.

Tearing occurred when the area development rate was 200% with a simultaneous biaxial stretching machine in an atmosphere at 150° C. Since the fabric was torn, it was not possible to measure the air permeability or sound absorption performance after stretching.

Comparative Example 3

A polyethylene terephthalate resin (1% using orthochlorophenol, solution viscosity ηsp/c: 0.77 at 25° C., melting point: 263° C.) was supplied to a general purpose melt spinning apparatus and melted at 300° C., discharged from a spinning nozzle having a spinning hole with a circular cross-section, and stretched at a spinning speed of 3500 m/min using a high-speed airflow traction device with an air jet, while the yarn was cooled and shaped as a fiber web (basis weight: 11.6 g/m$^2$, mean fiber size: 15.3 μm) on a net, after which a pair of flat rolls were used for thermocompression bonding at a calender linear pressure of 30 N/mm, with a surface temperature of 150° C. for the upper flat roll and a surface temperature of 150° C. for the lower flat roll, to obtain continuous filament webs (S1, S2).

Polyethylene terephthalate (solution viscosity ηsp/c: 0.50, melting point: 260° C.) was directly ejected from a melt blow nozzle, under conditions with a spinning temperature of 300° C., heated air at 320° C. and 1000 Nm$^3$/hr, to form an ultrafine fiber web (M) (basis weight: 6.8 g/m$^2$, mean fiber size: 1.7 μm).

A nonwoven fabric was obtained by merely stacking 3 layers, an ultrafine fiber web (M) between previously obtained continuous filament webs (S1), (S2), without integration. The physical properties of the obtained nonwoven fabric are shown in Tables 8 and 9.

Tearing occurred in the ultrafine fiber layer (M) when the area development rate was 200% with a simultaneous biaxial stretching machine in an atmosphere at 150° C. Since the fabric was torn, it was not possible to measure the air permeability or sound absorption performance after stretching.

Comparative Example 4

A polyethylene terephthalate resin (1% using orthochlorophenol, solution viscosity ηsp/c: 0.77 at 25° C., melting point: 263° C.) was supplied to a general purpose melt spinning apparatus and melted at 300° C., discharged from a spinning nozzle having a spinning hole with a circular cross-section, and stretched at a spinning speed of 3500 m/min using a high-speed airflow traction device with an air jet, while the yarn was cooled and shaped as a fiber web (basis weight: 11.6 g/m$^2$, mean fiber size: 15.3 μm) on a net, after which a pair of flat rolls were used for thermocompression bonding at a calender linear pressure of 30 N/mm, with a surface temperature of 150° C. for the upper flat roll and a surface temperature of 150° C. for the lower flat roll, to obtain continuous filament webs (S1, S2).

Polyethylene terephthalate (solution viscosity ηsp/c: 0.50, melting point: 260° C.) was directly ejected from a melt blow nozzle, under conditions with a spinning temperature of 300° C., heated air at 320° C. and 1000 Nm$^3$/hr, to form an ultrafine fiber web (M) (basis weight: 6.8 g/m$^2$, mean fiber size: 1.7 μm).

A nonwoven fabric was obtained by stacking 3 layers, an ultrafine fiber web (M) between previously obtained continuous filament webs (S1), (S2), and integrating them by ultrasonic welding with a welding area ratio of 11%. The physical properties of the obtained nonwoven fabric are shown in Tables 8 and 9.

Tearing occurred in the ultrafine fiber layer (M) when the area development rate was 200% with a simultaneous biaxial stretching machine in an atmosphere at 150° C. Since the fabric was torn, it was not possible to measure the air permeability or sound absorption performance after stretching.

Comparative Example 5

A nonwoven fabric was obtained in the same manner as Example 1, except that after forming the continuous long fiber layers (S1) and (S2) on the net, they were not nipped between a pre-compaction roll and conveyor net, and the surface temperature of the embossing roll was 30° C. while the surface temperature of the flat roll was 30° C. The physical properties of the obtained nonwoven fabric are shown in Tables 8 and 9.

Tearing of the MB layer occurred when the area development rate was 200% with a simultaneous biaxial stretching machine in an atmosphere at 150° C. Since the fabric was torn, it was not possible to measure the air permeability or sound absorption performance after stretching.

Comparative Example 6

A nonwoven fabric was obtained in the same manner as Example 1, except that the surface temperature of the embossing roll was 90° C. and the surface temperature of the flat roll was 90° C. The physical properties of the obtained nonwoven fabric are shown in Tables 8 and 9.

Stretch irregularities were produced when the area development rate was 200% with a simultaneous biaxial stretching machine in an atmosphere at 150° C.

Comparative Example 7

A nonwoven fabric was obtained in the same manner as Example 5, except that after forming the continuous long fiber layers (S1) and (S2) on the net, they were not nipped between a pre-compaction roll and conveyor net. The physical properties of the obtained nonwoven fabric are shown in Tables 8 and 9.

Comparative Example 8

A nonwoven fabric was obtained in the same manner as Example 5, except that after forming the continuous long fiber layers (S1) and (S2) on the net, they were nipped between a smooth pre-compaction roll with a surface temperature of 60° C. and a conveyor net, with a low pressure of 4 N/mm, and each layer was gently integrated. The physical properties of the obtained nonwoven fabric are shown in Tables 8 and 9.

Comparative Example 9

A nonwoven fabric was obtained in the same manner as Example 13, except that after forming the continuous long fiber layers (S1) and (S2) on the net, they were not nipped between a pre-compaction roll and conveyor net. The physical properties of the obtained nonwoven fabric are shown in Tables 8 and 9.

Comparative Example 10

A nonwoven fabric was obtained in the same manner as Example 13, except that after forming the continuous long fiber layers (S1) and (S2) on the net, they were nipped between a smooth pre-compaction roll with a surface temperature of 60° C. and a conveyor net, with a low pressure of 4 N/mm, and each layer was gently integrated. The physical properties of the obtained nonwoven fabric are shown in Tables 8 and 9.

Comparative Example 11

With reference to Example 1 of Japanese Unexamined Patent Publication No. 2013-163869, a polyethylene terephthalate spinning nozzle was used to form a continuous filament web (S1) made of polyethylene terephthalate (melting point: 263° C.) by a spunbond method on a meshed net at a spinning temperature of 300° C. and a spinning speed of 4500 m/min, and then yarn made of polyethylene terephthalate (melting point: 265° C.) was ejected onto the obtained continuous long fiber web (S1, basis weight: 10 g/m$^2$, mean fiber size: 14 μm) using a melt blowing nozzle under conditions with a spinning temperature of 300° C., a heated air temperature of 320° C., 1000 Nm$^2$/hr and a blasting distance of 75 mm, to form an ultrafine fiber web (basis weight: 5 g/m$^2$, mean fiber size: 3 μm). A two-component spinning nozzle was used to layer a sheath-core long fiber web (S2, basis weight: 10 g/m$^2$, mean fiber size: 18 μm) comprising copolymerized polyester (melting point: 210° C.) as the sheath component and polyethylene terephthalate (melting point: 265° C.) as the core component on an ultrafine fiber web, by a spunbond method at a spinning speed of 4500 m/min. The obtained layered web was then subjected to partial thermocompression bonding under conditions with a thermocompression bonded-section area ratio during thermocompression bonding of 15%, using a pin-pattern embossing roll and a flat roll having distances of 3.6 mm between thermocompression bonded sections in the MD direction and distances of 3.6 mm between thermocompression bonded sections in the CD direction, with the surface temperature of the embossing roll at 230° C. and the surface temperature of the flat roll at 165° C., and a linear pressure of 300 N/cm, to obtain a nonwoven fabric having a basis weight of 25 g/m$^2$, a thickness of 0.17 mm and a partial thermocompression bonding rate of 15%. The physical properties of the obtained nonwoven fabric are shown in Tables 8 and 9.

Tearing occurred when the area development rate was 200% with a simultaneous biaxial stretching machine in an atmosphere at 150° C. Since the fabric was torn, it was not possible to measure the air permeability or sound absorption performance after stretching.

Comparative Example 12

A polyethylene terephthalate resin (1% using orthochlorophenol, solution viscosity ηsp/c: 0.77 at 25° C., melting point: 263° C.) was supplied to a general purpose melt spinning apparatus and melted at 300° C., discharged from a spinning nozzle having a spinning hole with a circular cross-section, and stretched at a spinning speed of 4500 m/min using a high-speed airflow traction device with an air jet, while the yarn was cooled and shaped as a fiber web (S1) (basis weight: 29.0 g/m$^2$, mean fiber size: 13 μm) on a net, after which it was nipped between a smooth pre-compaction roll with a surface temperature of 160° C. and a conveyor net at a low pressure of 4 N/mm while gently preventing fluffing. Polyethylene terephthalate (solution viscosity ηsp/c: 0.50, melting point: 260° C.) was directly ejected onto the obtained continuous filament web (S1) from a melt blow nozzle, under conditions with a spinning temperature of 300° C., heated air at 320° C. and 1000 Nm$^3$/hr, to form an ultrafine fiber web (M) (basis weight: 12.0 g/m$^2$, mean fiber size: 1.7 μm). During this step, the distance from the melt blow nozzle to the continuous long fiber layer was 70 mm, and the suction wind speed at the collecting surface directly under the melt blow nozzle was set to 7 m/sec. Next, a two-component spinning nozzle was used to form a continuous filament web (S2) (basis weight: 29.0 g/m², mean fiber size: 13 μm), of a copolymerized polyester resin (melting point: 208° C.) as the sheath component and a polyethylene terephthalate resin (melting point: 263° C.) as the core component, on a net, after which it was nipped between a smooth pre-compaction roll with a surface temperature of 160° C. and a conveyor net at a low pressure of 4 N/mm, gently integrating each of the layers. The obtained layered web was then thermocompression bonded using a pair of flat rolls at a calender linear pressure of 30 N/mm, with a surface temperature of 230° C. for the upper flat roll and a surface temperature of 230° C. for the lower flat roll, to obtain a nonwoven fabric with a basis weight of 30 g/m² and a bulk density of 0.60 g/cm³. The physical properties of the obtained nonwoven fabric are shown in Tables 8 and 9.

Tearing occurred when the area development rate was 200% with a simultaneous biaxial stretching machine in an atmosphere at 150° C. Since the fabric was torn, it was not possible to measure the air permeability or sound absorption performance after stretching.

TABLE 8

| | | Comparative Example | | | | | |
|---|---|---|---|---|---|---|---|
| | | 1 | 2 | 3 | 4 | 5 | 6 |
| Upper layer (S1) | Component A starting material | — | — | PET | PET | PET | PET |
| | Component B starting material | — | — | — | — | — | — |
| | Component B glass transition point (° C.) | — | — | — | — | — | — |
| | Component B addition (wt %) | — | — | — | — | — | — |
| | Spinning speed (m/min) | — | — | 3500 | 3500 | 3500 | 3500 |
| | Birefringence | — | — | 0.042 | 0.042 | 0.042 | 0.042 |
| | Fiber size (μm) | — | — | 15.3 | 15.3 | 15.3 | 15.3 |
| | Basis weight (g/m²) | — | — | 11.6 | 11.6 | 11.6 | 11.6 |
| Middle layer (M) | Resin type | PET | PET | PET | PET | PET | PET |
| | Fiber size (μm) | 1.7 | 1.7 | 1.7 | 1.7 | 1.7 | 1.7 |
| | Basis weight (g/m²) | 6.8 | 10 | 6.8 | 6.8 | 6.8 | 6.8 |
| Lower layer (S2) | Component A starting material | — | — | PET | PET | PET | PET |
| | Component B starting material | — | — | — | — | — | — |
| | Component B glass transition point (° C.) | — | — | — | — | — | — |
| | Component B addition (wt %) | — | — | — | — | — | — |
| | Spinning speed (m/min) | — | — | 3500 | 3500 | 3500 | 3500 |
| | Birefringence | — | — | 0.042 | 0.042 | 0.042 | 0.042 |
| | Fiber size (μm) | — | — | 15.3 | 15.3 | 15.3 | 15.3 |
| | Basis weight (g/m²) | — | — | 11.6 | 11.6 | 11.6 | 11.6 |
| Total basis weight (g/m²) | | 10 | 10 | 30 | 30 | 30 | 30 |
| Integration method | | — | — | No | Ultrasonic welding | Calender | Calender |
| Contact bonding area ratio (%) | | — | — | — | 11 | 11 | 11 |
| Emboss pattern | | — | — | — | — | IL | IL |
| Distance between contact-bonded sections (mm) | Machine direction | — | — | — | 3 | 3 | 3 |
| | Cross direction | — | — | — | 3 | 2.8 | 2.8 |
| Calender temperature (° C.) | Upper roll | — | — | — | — | 30 | 90 |
| | Lower roll | — | — | — | — | 30 | 90 |
| Calender pressure (N/mm) | | — | — | — | — | 30 | 30 |
| Thickness (mm) | | 0.05 | 0.07 | 0.14 | 0.14 | 0.17 | 0.15 |
| Overall bulk density (g/cm³) | | 0.14 | 0.14 | 0.21 | 0.21 | 0.18 | 0.2 |
| Bonding area ratio of middle layer (M) and upper/lower layers (S1, S2) (%) | | 0 | 0 | 0 | 15 | 11 | 35 |
| Middle layer (M) | Thickness (μm) | 48 | 70 | 48 | 42 | 35 | 25 |
| | Bulk density (g/cm³) | 0.14 | 0.14 | 0.14 | 0.16 | 0.19 | 0.27 |
| Air permeability (cc/cm²/sec) | | 70 | 36 | 69 | 65 | 60 | 59 |
| Sound absorption evaluation (%) | Mean sound absorption coefficient before stretching (%) | 28 | 36 | 31 | 32 | 33 | 37 |
| | Sound absorption-imparting effect (%) | 8 | 16 | 11 | 12 | 13 | 17 |
| | Evaluation | P | P | P | P | P | P |

| | | Comparative Example | | | | | |
|---|---|---|---|---|---|---|---|
| | | 7 | 8 | 9 | 10 | 11 | 12 |
| Upper layer (S1) | Component A starting material | PET | PET | PET | PET | PET | PET |
| | Component B starting material | — | — | PM130N | PM130N | — | — |
| | Component B glass transition point (° C.) | — | — | 120 | 120 | — | — |
| | Component B addition (wt %) | — | — | 1 | 1 | — | — |
| | Spinning speed (m/min) | 3500 | 3500 | 4500 | 4500 | 4500 | 4500 |
| | Birefringence | 0.042 | 0.042 | 0.041 | 0.041 | 0.08 | 0.08 |
| | Fiber size (μm) | 15.3 | 15.3 | 13.6 | 13.6 | 14 | 13 |
| | Basis weight (g/m²) | 8.8 | 8.8 | 8.8 | 8.8 | 10 | 29 |
| Middle layer (M) | Resin type | PET | PET | PET | PET | PET | PET |
| | Fiber size (μm) | 1.7 | 1.7 | 1.7 | 1.7 | 3 | 1.7 |
| | Basis weight (g/m²) | 7.5 | 7.5 | 7.5 | 7.5 | 5 | 12 |
| Lower layer (S2) | Component A starting material | PET | PET | PET | PET | CoPET/PET | PET |
| | Component B starting material | — | — | PM130N | PM130N | — | — |

TABLE 8-continued

|  |  |  |  |  |  |  |  |
|---|---|---|---|---|---|---|---|
|  | Component B glass transition point (° C.) | — | — | 120 | 120 | — | — |
|  | Component B addition (wt %) | — | — | 1 | 1 | — | — |
|  | Spinning speed (m/min) | 3500 | 3500 | 4500 | 4500 | 4500 | 4500 |
|  | Birefringence | 0.042 | 0.042 | 0.041 | 0.041 | 0.07 | 0.08 |
|  | Fiber size (μm) | 15.3 | 15.3 | 13.6 | 13.6 | 18 | 13 |
|  | Basis weight (g/m$^2$) | 8.8 | 8.8 | 8.8 | 8.8 | 10 | 29 |
| Total basis weight (g/m$^2$) |  | 25 | 25 | 25 | 25 | 25 | 70 |
| Integration method |  | Calender | Calender | Calender | Calender | Calender | Calender |
| Contact bonding area ratio (%) |  | 8 | 8 | 8 | 8 | 15 | 100 |
| Emboss pattern |  | Pin | Pin | Pin | Pin | Pin | Flat |
| Distance between contact-bonded sections (mm) | Machine direction | 3.4 | 3.4 | 3.4 | 3.4 | 3.6 | — |
|  | Cross direction | 3.4 | 3.4 | 3.4 | 3.4 | 3.6 | — |
| Calender temperature (° C.) | Upper roll | 165 | 165 | 165 | 165 | 230 | 230 |
|  | Lower roll | 165 | 165 | 165 | 165 | 165 | 230 |
| Calender pressure (N/mm) |  | 30 | 30 | 30 | 30 | 30 | 30 |
| Thickness (mm) |  | 0.13 | 0.13 | 0.13 | 0.13 | 0.17 | 0.09 |
| Overall bulk density (g/cm$^3$) |  | 0.19 | 0.19 | 0.19 | 0.19 | 0.15 | 0.78 |
| Bonding area ratio of middle layer (M) and upper/lower layers (S1, S2) (%) |  | 37 | 41 | 38 | 42 | 43 | 95 |
| Middle layer (M) | Thickness (μm) | 20 | 20 | 20 | 20 | 14.3 | 15 |
|  | Bulk density (g/cm$^3$) | 0.38 | 0.38 | 0.38 | 0.38 | 0.35 | 0.8 |
|  | Air permeability (cc/cm$^2$/sec) | 57 | 57 | 56 | 56 | 70 | 0.9 |
| Sound absorption evaluation (%) | Mean sound absorption co-efficient before stretching (%) | 36 | 38 | 37 | 39 | 35 | 39 |
|  | Sound absorption-imparting effect (%) | 16 | 18 | 17 | 19 | 15 | 19 |
|  | Evaluation | P | P | P | P | P | P |

TABLE 9

|  |  | Comparative Example |  |  |  |  |  |
|---|---|---|---|---|---|---|---|
|  |  | 1 | 2 | 3 | 4 | 5 | 6 |
| Fluff grade | Embossing roll surface | 0 | 0 | 3 | 3 | 0 | 1 |
|  | Flat roll surface | 0 | 0 | 3 | 3 | 0 | 1 |
|  | Fluff grade difference | 0 | 0 | 0 | 0 | 0 | 1 |
| 180° C. Dry heat contraction (%) |  | 50 | 45 | 15 | 15 | 23 | 23 |
| Stress during biaxial stretching (150° C., 200% area development rate) | MD | Tearing | Tearing | Tearing | Tearing | Tearing | 11.3 |
|  | CD | Tearing | Tearing | Tearing | Tearing | Tearing | 3.9 |
|  | MD + CD | Tearing | Tearing | Tearing | Tearing | Tearing | 15.2 |
| State of fabric after biaxial stretching |  | P | P | P | P | P | F |
| Air permeability after biaxial stretching (cc/cm$^2$/sec) |  | — | — | — | — | — | 150 |
| Increase in air permeability before and after biaxial stretching |  | Tearing | Tearing | Tearing | Tearing | Tearing | 254% |
| Evaluation of sound absorption after stretching (%) | Mean sound absorption coefficient after stretching (%) | — | — | — | — | — | 24 |
|  | Evaluation | P | P | P | P | P | G |

|  |  | Comparative Example |  |  |  |  |  |
|---|---|---|---|---|---|---|---|
|  |  | 7 | 8 | 9 | 10 | 11 | 12 |
| Fluff grade | Embossing roll surface | 2.2 | 2.2 | 2.7 | 2.7 | 3.4 | 5 |
|  | Flat roll surface | 2.4 | 2.4 | 2.8 | 2.8 | 3.5 | 5 |
|  | Fluff grade difference | 0.2 | 0.2 | 0.1 | 0.1 | 0.1 | 5 |
| 180° C. Dry heat contraction (%) |  | 3.9 | 3.9 | 2.5 | 2.5 | 2.5 | 0.5 |
| Stress during biaxial stretching (150° C., 200% area development rate) | MD | 13.5 | 13.5 | 13.6 | 13.6 | Tearing | Tearing |
|  | CD | 4.3 | 4.3 | 4.5 | 4.5 | Tearing | Tearing |
|  | MD + CD | 17.8 | 17.8 | 18.1 | 18.1 | Tearing | Tearing |
| State of fabric after biaxial stretching |  | G | G | G | G | P | P |
| Air permeability after biaxial stretching (cc/cm$^2$/sec) |  | 97 | 97 | 91 | 96 | — | — |
| Increase in air permeability before and after biaxial stretching |  | 176% | 176% | 169% | 178% | Tearing | Tearing |
| Evaluation of sound absorption after stretching (%) | Mean sound absorption coefficient after stretching (%) | 25 | 25 | 26 | 25 | — | — |
|  | Evaluation | G | G | G | G | P | P |

INDUSTRIAL APPLICABILITY

The nonwoven fabric and layered nonwoven fabric of the invention has satisfactory moldability, a small thickness, a light weight and excellent shape stability, while also having air permeability controlled to within a fixed range even after molding and being able to provide sound-absorbing base materials with high sound absorption properties at the low to mid frequencies of 1000 Hz, 1600 Hz, 2000 Hz, 2500 Hz, 3150 Hz and 4000 Hz, and it can therefore be suitably used as a skin material for moldable composite sound-absorbing materials, and especially for those used in vehicles, homes, household electrical appliances and construction equipment.

The invention claimed is:

1. A nonwoven fabric having a layered structure in which at least one ultrafine fiber layer (M) with a mean fiber size of 0.3 μm to 7 μm is integrated with at least one continuous long fiber layer (S) with a mean fiber size of 10 μm to 30 μm, wherein the bonding area ratio between the ultrafine fiber layer (M) and the continuous long fiber layer (S) is 45% to 80%; the integration is by partial thermocompression bonding; and the contact bonding area ratio in the partial thermocompression bonding is 6% to 35%, and the distance between the partial thermocompression bonded sections is 0.6 mm to 3.5 mm in both the MD (machine direction) of the nonwoven fabric, and the CD (cross direction) that is perpendicular to the MD.

2. The nonwoven fabric according to claim 1, wherein the basis weight of the ultrafine fiber layer (M) is 1 g/m$^2$ to 40 g/m$^2$.

3. The nonwoven fabric according to claim 1, wherein the continuous long fiber layer (S) is composed of long fibers that contain 97.0 wt % to 99.9 wt % of a polyester (component A) and 0.1 wt % to 3.0 wt % of a thermoplastic resin with a glass transition point temperature of 114° C. to 160° C. (component B), and the bulk density of the ultrafine fiber layer (M) is 0.35 g/cm$^3$ to 0.70 g/cm$^3$.

4. The nonwoven fabric according to claim 3, wherein component A is polyethylene terephthalate and component B is a polyacrylate-based resin.

5. The nonwoven fabric according to claim 1, wherein the continuous long fiber layer (S) is composed of long fibers with a birefringence of 0.04 to 0.07, and the bulk density of the ultrafine fiber layer (M) is 0.35 g/cm$^3$ to 0.70 g/cm$^3$.

6. The nonwoven fabric according to claim 1, wherein the nonwoven fabric has on its surface a continuous long fiber layer that includes fibers with a melting point of at least 30° C. lower than the melting point of the other layers.

7. The nonwoven fabric according to claim 1, wherein the basis weight of the nonwoven fabric is 20 g/m$^2$ to 150 g/m$^2$, and the thickness is 2 mm or smaller.

8. The nonwoven fabric according to claim 1, wherein the ultrafine fiber layer (M) and the continuous long fiber layer (S) are both composed of polyester-based fibers.

9. A layered nonwoven fabric in which two or more nonwoven fabrics according to claim 1 are layered.

10. The layered nonwoven fabric according to claim 9, which includes two or more ultrafine fiber layers (M), wherein one or more continuous long fiber layers (S) are disposed between each of the ultrafine fiber layers (M), and the distances between each of the ultrafine fiber layers (M) are 30 μm to 200 μm.

11. The layered nonwoven fabric according to claim 9, wherein two or more nonwoven fabrics integrated by thermocompression bonding and in a SM layered or SMS layered structure are layered in an integral manner.

12. The layered nonwoven fabric according to claim 9, wherein the bonding between the fibers of the ultrafine fiber layers (M) and continuous long fiber layers (S) or of the continuous long fiber layers (S) is point bonding.

13. A nonwoven fabric or layered nonwoven fabric according to claim 1, which is to be used as a skin material of a sound-absorbing material.

14. A composite sound-absorbing material in which a nonwoven fabric or layered nonwoven fabric according to claim 13 and an open-cell resin foam or fiber porous material as a sound-absorbing material are layered.

15. The composite sound-absorbing material according to claim 14, wherein the mean sound absorption coefficient A (%) for sounds impinging from the skin material side at frequencies of 1000 Hz, 1600 Hz, 2000 Hz, 2500 Hz, 3150 Hz and 4000 Hz, by normal incidence measurement according to JIS A 1405, is at least 45% higher than that of the sound-absorbing base material alone.

* * * * *